United States Patent
Kitamura et al.

(10) Patent No.: US 11,530,334 B2
(45) Date of Patent: Dec. 20, 2022

(54) HARDCOAT FILM, ARTICLE AND IMAGE DISPLAY DEVICE HAVING HARDCOAT FILM, AND METHOD FOR MANUFACTURING HARDCOAT FILM

(71) Applicant: FUJIFILM Corporation, Tokyo (JP)

(72) Inventors: Tetsu Kitamura, Kanagawa (JP); Akio Tamura, Kanagawa (JP); Yuta Fukushima, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 40 days.

(21) Appl. No.: 17/010,125

(22) Filed: Sep. 2, 2020

(65) Prior Publication Data

US 2020/0398542 A1    Dec. 24, 2020

Related U.S. Application Data

(63) Continuation of application No. PCT/JP2019/010931, filed on Mar. 15, 2019.

(30) Foreign Application Priority Data

Mar. 30, 2018 (JP) .............................. JP2018-069957
Jul. 27, 2018 (JP) .............................. JP2018-141894

(51) Int. Cl.

| | |
|---|---|
| C09D 183/06 | (2006.01) |
| G02B 1/14 | (2015.01) |
| B32B 27/08 | (2006.01) |
| B32B 27/28 | (2006.01) |
| C08L 83/06 | (2006.01) |
| C08J 7/043 | (2020.01) |
| C08J 7/046 | (2020.01) |

(52) U.S. Cl.
CPC ............ C09D 183/06 (2013.01); B32B 27/08 (2013.01); B32B 27/283 (2013.01); C08J 7/043 (2020.01); C08J 7/046 (2020.01); C08L 83/06 (2013.01); G02B 1/14 (2015.01); *B32B 2305/72* (2013.01); *B32B 2307/536* (2013.01); *B32B 2307/584* (2013.01); *B32B 2383/00* (2013.01); *B32B 2457/20* (2013.01); *Y10T 428/26* (2015.01); *Y10T 428/31663* (2015.04)

(58) Field of Classification Search
CPC ......... C09D 183/06; C08J 7/043; C08J 7/046; C08J 5/18; G02B 1/14; B32B 27/08; B32B 27/283; B32B 2383/00; B32B 2305/72; B32B 2307/536; B32B 2307/584; B32B 2457/20; C08L 83/06; Y10T 428/31663; Y10T 428/26; C08K 5/0025; C08G 77/14; C08G 59/30; C08G 77/20
See application file for complete search history.

(56) References Cited

U.S. PATENT DOCUMENTS

| | | | |
|---|---|---|---|
| 2008/0286583 A1* | 11/2008 | Mori ................. | C09D 7/63 428/447 |
| 2016/0046830 A1* | 2/2016 | Kim .................. | C08J 7/046 428/412 |
| 2016/0297933 A1 | 10/2016 | Kuwana et al. | |
| 2018/0230316 A1* | 8/2018 | Kim .................. | G02B 1/14 |
| 2018/0282485 A1 | 10/2018 | Kuwana et al. | |
| 2022/0002494 A1 | 1/2022 | Kuwana et al. | |

FOREIGN PATENT DOCUMENTS

| | | |
|---|---|---|
| CN | 106256837 A | 12/2016 |
| CN | 106459370 A | 2/2017 |
| CN | 106707653 A | 5/2017 |
| CN | 108027451 A | 5/2018 |
| JP | 03-281616 A | 12/1991 |
| JP | 08-253542 A | 10/1996 |
| JP | 2005-092099 A | 4/2005 |
| JP | 2005-179543 A | 7/2005 |
| JP | 2013-091703 A | 5/2013 |
| JP | 2015-212353 A | 11/2015 |
| JP | 2017-113943 A | 6/2017 |
| JP | 2017/008148 | * 12/2017 |

(Continued)

OTHER PUBLICATIONS

Machine translation of JP 6557522 corresponding to JP 2017/008148, retrieved Sep. 7, 2021.*
Office Action, issued by the Japanese Patent Office dated Mar. 2, 2021, in connection with Japanese Patent Application No. 2020-510667.
International Search Report issued in PCT/JP2019/010931 dated Jun. 18, 2019.
Written Opinion issued in PCT/JP2019/010931 dated Jun. 18, 2019.
International Preliminary Report on Patentability completed by WIPO dated Oct. 6, 2020, in connection with International Patent Application No. PCTIJP2019/010931.

(Continued)

*Primary Examiner* — Michael B Nelson
(74) *Attorney, Agent, or Firm* — Edwards Neils LLC; Jean C. Edwards, Esq.

(57) ABSTRACT

A hardcoat film includes a substrate; a hardcoat layer; and an anti-scratch layer, where the hardcoat layer includes a cured product of polyorganosilsesquioxane, the polyorganosilsesquioxane has a siloxane constitutional unit containing a (meth)acryloyl group and a siloxane constitutional unit containing an epoxy group and is represented by the General Formula (1), a film thickness of the anti-scratch layer is 0.05 to 5 μm, and the anti-scratch layer includes a cured product of a compound having two or more (meth)acryloyl groups in one molecule, where Ra represents a group containing a (meth)acryloyl group; Rb represents a group containing an epoxy group; Rc represents a monovalent substituent; p, q, and r represent a proportion of Ra, Rb, and Rc in the General Formula (1) respectively; p+q+r is 100; p and q are greater than 0; r is equal to or greater than 0; p/q is 0.01 to 99.

18 Claims, No Drawings

(56) References Cited

FOREIGN PATENT DOCUMENTS

| | | |
|---|---|---|
| WO | 2017/160027 A1 | 9/2017 |
| WO | WO 2017160027 * | 12/2017 |

OTHER PUBLICATIONS

Office Action, issued by the State Intellectual Property Office dated Feb. 25, 2022, in connection with Chinese Patent Application No. 201980022161.1.

* cited by examiner

HARDCOAT FILM, ARTICLE AND IMAGE DISPLAY DEVICE HAVING HARDCOAT FILM, AND METHOD FOR MANUFACTURING HARDCOAT FILM

CROSS-REFERENCE TO RELATED APPLICATIONS

This is a continuation of International Application No. PCT/JP2019/010931 filed on Mar. 15, 2019, which was published under Article 21(2) in Japanese, and which claims priority under 35 U.S.C. § 119(a) from Japanese Patent Application No. 2018-069957 filed on Mar. 30, 2018 and Japanese Patent Application No. 2018-141894 filed on Jul. 27, 2018, The above applications are hereby expressly incorporated by reference, in their entirety, into the present application.

BACKGROUND OF THE INVENTION

1. Field of the Invention

The present invention relates to a hardcoat film, an article and an image display device that have the hardcoat film, and a method for manufacturing the hardcoat film.

2. Description of the Related Art

For image display devices such as a display device using a cathode ray tube (CRT), a plasma display panel (PDP), an electroluminescence display (ELD), a vacuum fluorescent display (VFD), a field emission display (FED), and a liquid crystal display (LCD), in order to prevent the display surface from being scratched, it is preferable to provide an optical film (hardcoat film) having a hardcoat layer on a substrate.

As an optical film having excellent rub resistance, for example. JP1991-281616A (JP-H03-281616A) describes a film containing a cured product of polyorganosilsesquioxane having a (meth)acryl group. JP2005-179543A describes a silica sol obtained by hydrolyzing a silicon compound containing an epoxy group. JP2017-113943A. JP2013-091703A, and JP2005-092099A describe a film containing a cured product of silsesquioxane having a (meth)acryloyl group and an epoxy group.

SUMMARY OF THE INVENTION

In recent years, for example, for smartphones and the like, there has been an increasing need for flexible displays. Accordingly, there has been a demand for an optical film that is hardly broken even being repeatedly folded (an optical film having excellent resistance to repeated folding). Particularly, there has been a strong demand for an optical film that can simultaneously satisfy hardness, rub resistance, and resistance to repeated folding.

As a result of examination, the inventors of the present invention have found that the films described in JP1991-281616A OP-H03-281616A) and JP2005-179543A cannot simultaneously satisfy hardness, rub resistance, and resistance to repeated folding. Furthermore, the inventors have found that the rub resistance of the films described in JP2017-113943A, JP2013-091703A, and JP2005-092099A are unsatisfactory.

An object of the present invention is to provide a hardcoat film having excellent rub resistance, high hardness, and excellent resistance to repeated folding, an article and an image display device that have the hardcoat film, and a method for manufacturing the hardcoat film.

As a result of intensive examination, the inventors of the present invention have found that the above object can be achieved by the following means.

[1] A hardcoat film having a substrate, a hardcoat layer, and an anti-scratch layer, in which the hardcoat layer includes a cured product of polyorganosilsesquioxane, the polyorganosilsesquioxane has, at least, a siloxane constitutional unit containing a (meth)acryloyl group and a siloxane constitutional unit containing an epoxy group and is represented by the following General Formula (1), a film thickness of the anti-scratch layer is 0.05 to 5 µm, and the anti-scratch layer includes a cured product of a compound having two or more (meth)acryloyl groups in one molecule.

(1)

In the General Formula (1), Ra represents a group containing a (meth)acryloyl group, Rb represents a group containing an epoxy group, and Rc represents a monovalent substituent, p, q, and r represent a proportion of Ra, Rb, and Rc in the General Formula (1) respectively, p+q+r is 100, p and q are greater than 0, and r is equal to or greater than 0. Here, p/q is 0.01 to 99. In a case where there are a plurality of Ra's, a plurality of Rb's, and a plurality of Rc's in the General Formula (1), the plurality of Ra's may be the same as or different from each other, the plurality of Rb's may be the same as or different from each other, and the plurality of Rc's may be the same as or different from each other. In a case where there is a plurality of Rc's in the General Formula (1), the plurality of Rc's may form a bond with each other.

[2] The hardcoat film described in [1], in which Rb in the General Formula (1) is a group having a condensed ring structure of an epoxy group and an alicyclic group.

[3] The hardcoat film described in [2], in which the group having a condensed ring structure of an epoxy group and an alicyclic group is a group having an epoxycyclohexyl group.

[4] The hardcoat film described in any one of [1] to [3], in which in the General Formula (1), (p+q)/(p+q+r) is 0.5 to 1.0.

[5] The hardcoat film described in any one of [1] to [4], in which in the General Formula (1), p/q is 0.5 to 2.0.

[6] The hardcoat film described in any one of [1] to [5], in which in the General Formula (1), there is a plurality of Rc's, the plurality of Rc's form a bond with each other, and r/(p+q+r) is 0.005 to 0.20.

[7] The hardcoat film described in any one of [1] to [6], in which a weight-average molecular weight of the polyorganosilsesquioxane is 2,000 to 20,000.

[8] The hardcoat film described in any one of [1] to [7], in which the compound having two or more (meth)acryloyl groups in one molecule is polyorganosilsesquioxane having (meth)acryloyl groups and is represented by the following General Formula (2).

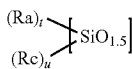
(2)

In the General Formula (2), Ra represents a group containing a (meth)acryloyl group, and Rc represents a monovalent substituent, t and u represent a proportion of Ra and Rc in the General Formula (2) respectively, t+u=100, t is greater than 0, and u is equal to or greater than 0. In a case where there are a plurality of Ra's and a plurality of Rc's in the General Formula (2), the plurality of Ra's may be the same as or different from each other and the plurality of Rc's may be the same as or different from each other. In a case where there is a plurality of Rc's in the General Formula (2), the plurality of Rc's may form a bond with each other.

[9] The hardcoat film described in any one of [1] to [8], in which a film thickness of the hardcoat layer is 1 to 50 μm.

[10] The hardcoat film described in any one of [1] to [9], wherein the substrate is a plastic substrate.

[11] An article having the hardcoat film described in any one of [1] to [10].

[12] An image display device having the hardcoat film described in any one of [ ] to [10] as a surface protection film.

[13] A method for manufacturing a hardcoat film, including (I) coating a substrate with a composition for forming a hardcoat layer including polyorganosilsesquioxane so as to form a coating film (i) on the substrate, (II) performing a curing treatment on the coating film so as to form a hardcoat layer, (III) coating the hardcoat layer with a composition for forming an anti-scratch layer including a compound having two or more (meth)acryloyl groups in one molecule so as to form a coating film (ii) on the hardcoat layer, and (IV) performing a curing treatment on the coating film (ii) so as to form an anti-scratch layer.

Here, the aforementioned polyorganosilsesquioxane has at least a siloxane constitutional unit containing a (meth) acryloyl group and a silsesquioxane constitutional unit containing an epoxy group and is represented by the following General Formula (1).

(1)

In the General Formula (1), Ra represents a group containing a (meth)acryloyl group, Rb represents a group containing an epoxy group, and Rc represents a monovalent substituent, p, q, and r represent a proportion of Ra, Rb, and Rc in the General Formula (1) respectively, p+q+r is 100, p and q are greater than 0, and r is equal to or greater than 0. Here, p/q is 0.01 to 99. In a case where there are a plurality of Ra's, a plurality of Rb's, and a plurality of Rc's in the General Formula (1), the plurality of Ra's may be the same as or different from each other, the plurality of Rb's may be the same as or different from each other, and the plurality of Rc's may be the same as or different from each other. In a case where there is a plurality of Rc's in the General Formula (1) the plurality of Rc's may form a bond with each other.

The specific hardcoat film according to an embodiment of the present invention has extremely excellent rub resistance, high hardness, and excellent resistance to repeated folding. The mechanism that allows the hardcoat film to have the above properties unclear, but is assumed to be as below according to the inventors of the present invention.

The specific polyorganosilsesquioxane used in the present invention has an inorganic structure (a structure formed by a siloxane bond) and organic crosslinking groups (an epoxy group and a (meth)acryloyl group) that form an organic crosslink by a polymerization reaction. In a film obtained from this compound, an interpenetrating polymer network (IPN) structure is formed in which the network of the inorganic structure and the network formed of the organic crosslinking groups mutually penetrate. It is considered that as a result, high hardness and rub resistance resulting from the inorganic structure and resistance to repeated folding resulting from the organic crosslink may be simultaneously achieved.

Although an anti-scratch layer including a polymer of a (meth)acrylic compound (a compound having a (meth) acryloyl group) is provided to improve the rub resistance of the film to a high level, the polymer of the (meth)acrylic compound lacks flexibility. Generally, it is considered that for this reason, in a case where the anti-scratch layer thin enough not to impair the folding resistance of the film is provided, the improvement of rub resistance may be insufficient. The hardcoat layer in the present invention has high rub resistance resulting from cured product of the polyorganosilsesquioxane. Therefore, even though an anti-scratch layer having a film thickness of about 0.05 to 5 μm which does not impair the folding resistance of the entire film is used, the rub resistance of the film can be improved to a high level.

In addition, because the (meth)acryloyl group in the polyorganosilsesquioxane used in the hardcoat layer and the (meth)acrylic compound in the anti-scratch layer can form a bond, a laminated structure having high adhesiveness is obtained, and thus higher rub resistance can be exhibited.

According to the present invention, it is possible to provide a hardcoat film having excellent rub resistance, high hardness, and excellent resistance to repeated folding, an article and an image display device that have the hardcoat film, and a method for manufacturing the hardcoat film.

DESCRIPTION OF THE PREFERRED EMBODIMENTS

Hereinafter, embodiments of the present invention will be specifically described, but the present invention is not limited thereto. In the present specification, in a case where numerical values represent a value of physical properties, a value of characteristics, and the like, the description of "(numerical value 1) to (numerical value 2)" means "equal to or greater than (numerical value 1) and equal to or smaller than (numerical value 2)". Furthermore, "(meth)acrylate" represents at least one of acrylate and methacrylate, "(meth) acryl" represents at least one of acryl and methacryl, and "(meth)acryloyl" represents at least one of acryloyl and methacryloyl.

[Hardcoat Film]

The hardcoat film according to an embodiment of the present invention is a hardcoat film having a substrate, a hardcoat layer, and an anti-scratch layer, the hardcoat layer includes a cured product of polyorganosilsesquioxane, the polyorganosilsesquioxane has at least a siloxane constitutional unit containing a (meth)acryloyl group and a siloxane constitutional unit containing an epoxy group and is represented by General Formula (1) which will be described later, the film thickness of the anti-scratch layer is 0.05 to 5 μm, and the anti-scratch layer includes a cured product of a compound having two or more (meth)acryloyl groups in one molecule.

<Hardcoat Layer>

The hardcoat layer of the hardcoat film according to the embodiment of the present invention will be described.

The hardcoat layer includes a cured product of polyorganosilsesquioxane. The cured product of polyorganosilsesquioxane contained in the hardcoat layer is preferably a polymer (cured product) obtained by polymerizing polyorganosilsesquioxane by the irradiation of ionizing radiation or by heating.

(Polyorganosilsesquioxane)

The aforementioned polyorganosilsesquioxane used in the present invention (hereinafter, also referred to as polyorganosilsesquioxane of the present invention) has at least a siloxane constitutional unit containing a (meth)acryloyl group and a siloxane constitutional unit containing an epoxy group and is represented by General Formula (1).

(1)

In General Formula (1), Ra represents a group containing a (meth)acryloyl group. Rb represents a group containing an epoxy group, and Rc represents a monovalent substituent, p, q, and r represent a proportion of Ra, Rb, and Rc in General Formula (1) respectively, p+q+r is 100, p and q are greater than 0, and r is equal to or greater than 0. Here, p/q is 0.01 to 99. In a case where there are a plurality of Ra's, a plurality of Rb's, and a plurality of Rc's in General Formula (1), the plurality of Ra's may be the same as or different from each other, the plurality of Rb's may be the same as or different from each other, and the plurality of Rc's may be the same as or different from each other. In a case where there is a plurality of Rc's in General Formula (1), the plurality of Rc's may form a bond with each other.

[$SiO_{1.5}$] in General Formula (1) represents a structural portion composed of a siloxane bond (Si—O—Si) in the polyorganosilsesquioxane.

The polyorganosilsesquioxane is a network-type polymer or polyhedral cluster having a siloxane constitutional unit derived from a hydrolyzable trifunctional silane compound, and can form a random structure, a ladder structure, a cage structure, and the like by a siloxane bond. In the present invention, the structural portion represented by [$SiO_{1.5}$] may be any of the above structures or a mixture of a plurality of structures. The proportion of the random structure or ladder structure in the entire structural portion represented by [$SiO_{1.5}$] is preferably equal to or higher than 50%, more preferably equal to or higher than 70%, and even more preferably equal to or higher than 80%. Whether the ladder structure is formed can be qualitatively determined by checking whether or not absorption occurs which results from Si—O—Si expansion/contraction unique to the ladder structure found at around 1,020 to 1,050 $cm^{-1}$ by Fourier Transform Infrared Spectroscopy (FT-IR).

In General Formula (1), Ra represents a group containing a (meth)acryloyl group.

Examples of the group containing a (meth)acryloyl group include known groups having a (meth)acryloyl group.

Ra is preferably a group represented by General Formula (1a).

(1a)

In General Formula (1a), * represents a portion linked to Si in General Formula (1), $R^{11a}$ represents a substituted or unsubstituted alkylene group or a substituted or unsubstituted phenylene group, and $R^{12a}$ represents a hydrogen atom or a substituted or unsubstituted alkyl group.

$R^{11a}$ represents a substituted or unsubstituted alkylene group or a substituted or unsubstituted phenylene group.

Examples of the substituted or unsubstituted alkylene group represented by $R^{11a}$ include a substituted or unsubstituted alkylene group having 1 to 10 carbon atoms.

Examples of the alkylene group having 1 to 10 carbon atoms include a methylene group, an ethylene group, a propylene group, an isopropylene group, a n-butylene group, an isobutylene group, a s-butylene group, a t-butylene group, a n-pentylene group, an isopentylene group, a s-pentylene group, a t-pentylene group, a n-hexylene group, an isohexylene group, a s-hexylene group, a t-hexylene group, and the like.

In a case where the alkyl group has a substituent, examples of the substituent include a hydroxyl group, a carboxyl group, an alkoxy group, an aryl group, a heteroaryl group, a halogen atom, a nitro group, a cyano group, a silyl group, and the like.

In a case where the phenylene group represented by $R^{11a}$ has a substituent, examples of the substituent include a hydroxyl group, a carboxyl group, an alkoxy group, an alkyl group, a halogen atom, and the like.

$R^{11a}$ is preferably an unsubstituted linear alkylene group having 1 to 3 carbon atoms, and more preferably a propylene group.

$R^{12a}$ represents a hydrogen atom or a substituted or unsubstituted alkyl group.

Examples of the substituted or unsubstituted alkyl group represented by $R^{11a}$ include a substituted or unsubstituted alkyl group having 1 to 3 carbon atoms.

In a case where the alkyl group has a substituent, examples of the substituent include a hydroxyl group, a carboxyl group, an alkoxy group, an aryl group, a heteroaryl group, a halogen atom, a nitro group, a cyano group, a silyl group, and the like.

$R^{12a}$ is preferably a hydrogen atom or a methyl group, and more preferably a methyl group.

Ra is also preferably a group having a plurality of (meth)acryloyl groups. For example, Ra is preferably a group represented by General Formula (2a).

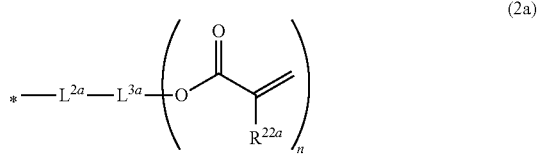
(2a)

In General Formula (2a), * represents a portion linked to Si in General Formula (1), $L^{2a}$ represents a single bond or a divalent linking group, $R^{22a}$ represents a hydrogen atom or a substituted or unsubstituted alkyl group, $L^{3a}$ represents an (n+1)-valent linking group, and n represents an integer equal to or greater than 2.

Examples of the divalent linking group represented by $L^{2a}$ include a substituted or unsubstituted alkylene group (preferably having 1 to 10 carbon atoms), —O—, —CO—, —COO—, —S—, —NH—, and a divalent linking group obtained by combining these.

Examples of the substituted or unsubstituted alkylene group include the substituted or unsubstituted alkylene group represented by $R^{11a}$ in General Formula (1a).

$L^{2a}$ is preferably a group in which two adjacent carbon atoms in a substituted or unsubstituted alkylene group having 1 to 10 carbon atoms are bonded to each other through at least one bond selected from —O—, —CO—, —COO—, —S—, and —NH—.

$R^{22a}$ has the same definition as $R^{12a}$ in General Formula (1a), and the preferred examples thereof are also the same.

n preferably represents an integer of 2 to 4, and more preferably represents 2 or 3.

$L^{3a}$ represents an (n+1)-valent linking group, and preferably represents an (n+1)-valent hydrocarbon group. In a case where $L^3$ represents an (n+1)-valent hydrocarbon group, the hydrocarbon group may further have a substituent (for example, a hydroxyl group, a carboxyl group, an alkoxy group, an aryl group, or a halogen atom), or may have a hetero atom (for example, an oxygen atom, a sulfur atom, or a nitrogen atom) in the hydrocarbon chain.

Ra in General Formula (1) is derived from a group (a group other than an alkoxy group and a halogen atom; for example. Ra in a hydrolyzable silane compound represented by Formula (A) which will be described later, or the like) bonded to a silicon atom in the hydrolyzable trifunctional silane compound used as a raw material of the polyorganosilsesquioxane.

Specific examples of Ra are as below, but the present invention is not limited thereto.

In the following specific examples, * represents a portion linked to Si in General Formula (1).

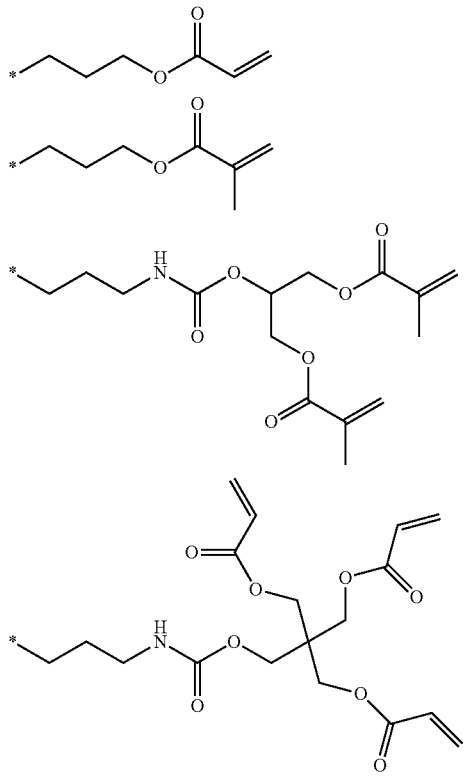

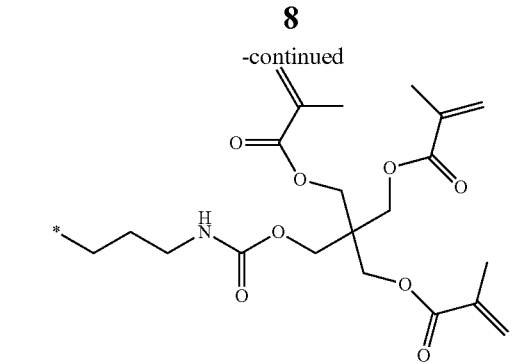

In general Formula (1), Rb represents a group containing an epoxy group.

It is preferable that the structure of Rb include none of amide, urea, and urethane bonds.

Examples of the group containing an epoxy group include known groups having an oxirane ring.

Rb is preferably a group represented by the following Formulas (1 b) to (4b).

(1b)

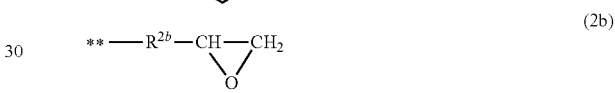
(2b)

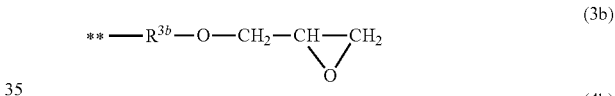
(3b)

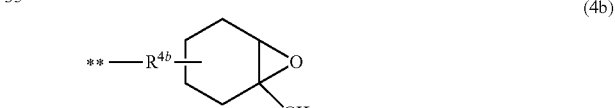
(4b)

In Formulas (1b) to (4b), ** represents a portion linked to Si in General Formula (1), and $R^{1b}$, $R^{2b}$, $R^{3b}$, and $R^{4b}$ represent a substituted or unsubstituted alkylene group.

The alkylene group represented by $R^{1b}$, $R^{2b}$, $R^{3b}$, and $R^{4b}$ is preferably a linear or branched alkylene group having 1 to 10 carbon atoms, and examples thereof include a methylene group, a methyl methylene group, a dimethyl methylene group, an ethylene group an i-propylene group, a n-propylene group, a n-butylene group, a n-pentylene group, a n-hexylene group, a n-decylene group, and the like.

In a case where the alkylene group represented by $R^{1b}$, $R^{2b}$, $R^{3b}$, and $R^{4b}$ has a substituent, examples of the substituent include a hydroxyl group, a carboxyl group, an alkoxy group, an aryl group, a halogen atom, and the like.

As $R^{1b}$, $R^{2b}$, $R^{3b}$, and $R^{4b}$, from the viewpoint of the surface hardness of the cured product and the curing properties, an unsubstituted linear alkylene group having 1 to 4 carbon atoms and an unsubstituted branched chain having 3 or 4 carbon atoms are preferable, an ethylene group, a n-propylene group, or an i-propylene group is more preferable, and an ethylene group or an n-propylene group is even more preferable.

Rb is preferably a group having a condensed ring structure of an epoxy group and an alicyclic group, more preferably a group having an epoxycyclohexyl group, and even more preferably a group represented by Formula (1 b).

Rb in General Formula (1) is derived from a group (a group other than an alkoxy group and a halogen atom; for example, Rb in a hydrolyzable silane compound represented by Formula (B) which will be described later, or the like) bonded to a silicon atom in the hydrolyzable trifunctional silane compound used as a raw material of the polyorganosilsesquioxane.

Specific examples of Rb are as below, but the present invention is not limited thereto. In the following specific examples, * represents a portion linked to Si in General Formula (1).

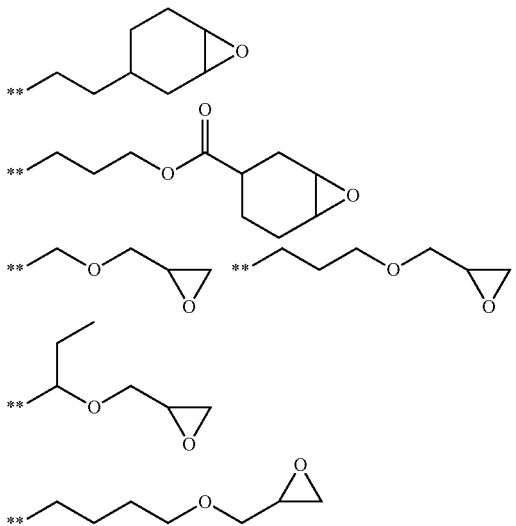

In General Formula (1), Rc represents a monovalent substituent.

Examples of the monovalent substituent represented by Rc include a hydrogen atom, a substituted or unsubstituted alkyl group, a substituted or unsubstituted cycloalkyl group, a substituted or unsubstituted aryl group, or a substituted or unsubstituted aralkyl group.

Examples of the alkyl group represented by Rc include an alkyl group having 1 to 10 carbon atoms. Examples thereof include linear or branched alkyl groups such as a methyl group, an ethyl group, a propyl group, a n-butyl group, an isopropyl group, an isobutyl group, a s-butyl group, a t-butyl group, and an isopentyl group.

Examples of the cycloalkyl group represented by Rc include a cycloalkyl group having 3 to 15 carbon atoms. Examples thereof include a cyclobutyl group, a cyclopentyl group, a cyclohexyl group, and the like.

Examples of the aryl group represented by Rc include an aryl group having 6 to 15 carbon atoms. Examples thereof include a phenyl group, a tolyl group, a naphthyl group, and the like.

Examples of the aralkyl group represented by Rc include an aralkyl group having 7 to 20 carbon atoms. Examples thereof include a benzyl group, a phenethyl group, and the like.

Examples of the substituted alkyl group, substituted cycloalkyl group, substituted aryl group, and substituted aralkyl group described above include groups obtained in a case where some or all of hydrogen atoms or main chain skeletons in the alkyl group, cycloalkyl group, aryl group, and aralkyl group described above are substituted with at least one kind of group selected from the group consisting of an ether group, an ester group, a carbonyl group, a halogen atom (such as a fluorine atom), a mercapto group, an amino group, and a hydroxy group (hydroxyl group), and the like.

Rc is preferably a substituted or unsubstituted alkyl group, and more preferably an unsubstituted alkyl group having 1 to 10 carbon atoms.

In a case where there is a plurality of Rc's in General Formula (1), the plurality of Rc's may form a bond with each other. The number of Rc's forming a bond with each other is preferably 2 or 3, and more preferably 2.

A group ($Rc_2$) formed by the bonding of two Rc's is preferably an alkylene group formed by the bonding of the aforementioned substituted or unsubstituted alkyl groups represented by Rc.

Examples of the alkylene group represented by $Rc_2$ include linear or branched alkylene groups such as a methylene group, an ethylene group, a propylene group, an isopropylene group, a n-butylene group, an isobutylene group, a s-butylene group, a t-butylene group, a n-pentylene group, an isopentylene group, a s-pentylene group, a t-pentylene group, a n-hexylene group, an isohexylene group, a s-hexylene group, a t-hexylene group, a n-heptylene group, an isoheptylene group, a s-heptylene group, a t-heptylene group, a n-octylene group, an isooctylene group, a s-octylene group, and a t-octylene group.

The alkylene group represented by $Rc_2$ is preferably an unsubstituted alkylene group having 2 to 20 carbon atoms, more preferably an unsubstituted alkylene group having 2 to 20 carbon atoms, even more preferably an unsubstituted alkylene group having 2 to 8 carbon atoms, and particularly preferably a n-butylene group, a n-pentylene group, a n-hexylene group, a n-heptylene group, or a n-octylene group.

A group ($Rc_3$) formed by the bonding of three Rc's is preferably a trivalent group obtained in a case where any one of the hydrogen atoms in the alkylene group represented by $Rc_2$ is removed.

Rc in General Formula (1) is derived from a group (a group other than an alkoxy group and a halogen atom; for example, $R_{c1}$ to $R_{c3}$ in a hydrolyzable silane compound represented by Formulas (C1) to (C3) which will be described later, or the like) bonded to a silicon atom in the hydrolyzable silane compound used as a raw material of the polyorganosilsesquioxane.

In General Formula (1), p and q are greater than 0, and r is equal to or greater than 0. Here, p/q is 0.01 to 99.

In a case where p/q is 0.01 to 99, high hardness, rub resistance, and resistance to repeated folding can be simultaneously achieved.

p/q is preferably 0.10 to 10, more preferably 0.25 to 4.0, and even more preferably 0.5 to 2.0.

(p+q)/(p+q+r) is preferably 0.5 to 1.0. In a case where the amount of groups represented by Ra or Rb is equal to or greater than 50% of the total amount of the groups represented by Ra, Rb, or Rc included in the polyorganosilsesquioxane of the present invention, the network composed of the organic crosslink is sufficiently formed in the hardcoat film including the polyorganosilsesquioxane of the present invention, and the IPN structure is formed better. Therefore, the performances such as hardness, rub resistance, and resistance to repeated folding are further improved.

(p+q)/(p+q+r) is more preferably 0.7 to 1.0, even more preferably 0.8 to 1.0, and particularly preferably 0.9 to 1.0.

It is also preferable that there is a plurality of Rc's in General Formula (1), and the plurality of Rc's form a bond with each other. In this case, r/(p+q+r) is preferably 0.005 to 0.20.

r/(p+q+r) is more preferably 0.005 to 0.10, and particularly preferably 0.005 to 0.050.

The weight-average molecular weight (Mw) of the polyorganosilsesquioxane of the present invention expressed in terms of standard polystyrene is preferably 2,000 to 20,000, more preferably 2,500 to 10,000, even more preferably 2,700 to 8,000, and particularly preferably 2,900 to 6,000.

In a case where the weight-average molecular weight is equal to or greater than 2,000, the heat resistance and rub resistance of the cured product tend to be further improved. On the other hand, in a case where the weight-average molecular weight is equal to or smaller than 20,000, the compatibility of the polyorganosilsesquioxane with other components in a curable composition tends to be improved.

The molecular weight dispersity (Mw/Mn) of the polyorganosilsesquioxane of the present invention that is measured by GPC and expressed in terms of standard polystyrene is, for example, 1.0 to 4.0, preferably 1.1 to 3.7, more preferably 1.2 to 3.0, even more preferably 1.3 to 2.5, and particularly preferably 1.45 to 1.80. In a case where the molecular weight dispersity is within the above range, the surface hardness of the cured product is further improved, the polyorganosilsesquioxane tends to be in a liquid state, and the handleability thereof tends to be improved. Mn represents a number-average molecular weight.

The weight-average molecular weight and the molecular weight dispersity of the polyorganosilsesquioxane of the present invention were measured using the following device under the following conditions.

Measurement device: trade name "LC-20AD" (manufactured by Shimadzu Corporation)

Columns: two Shodex KF-801 columns, KF-802, and KF-803 (manufactured by SHOWA DENKO K.K.)

Measurement temperature: 40° C.

Eluent: THF, sample concentration of 0.1% to 0.2% by mass

Flow rate: 1 mL/min

Detector: UV-VIS detector (trade name "SPD-20A", manufactured by Shimadzu Corporation)

Molecular weight: expressed in terms of standard polystyrene

<Method for Manufacturing Polyorganosilsesquioxane>

The polyorganosilsesquioxane of the present invention can be manufactured by a known polysiloxane manufacturing method and is not particularly limited. The polyorganosilsesquioxane can be manufactured preferably by a method of hydrolyzing and condensing two or more kinds of hydrolyzable silane compounds. As the hydrolyzable silane compounds, it is preferable to use a hydrolyzable trifunctional silane compound (a compound represented by Formula (A)) for forming the siloxane constitutional unit containing a (meth)acryloyl group) in the polyorganosilsesquioxane of the present invention and a hydrolyzable trifunctional silane compound (a compound represented by Formula (B)) for forming the siloxane constitutional unit containing an epoxy group in the polyorganosilsesquioxane of the present invention.

In a case where r in General Formula (1) is greater than 0, as the hydrolyzable silane compounds, it is preferable to use the compounds represented by Formulas (C1), (C2), or (C3) in combination.

Ra in Formula (A) has the same definition as Ra in General Formula (1), and preferred examples thereof are also the same.

$X^1$ in Formula (A) represents an alkoxy group or a halogen atom.

Examples of the alkoxy group represented by $X^1$ include an alkoxy group having 1 to 4 carbon atoms such as a methoxy group, an ethoxy group, a propoxy group, an isopropyloxy group, a butoxy group, and an isobutyloxy group.

Examples of the halogen atom represented by $X^1$ include a fluorine atom, a chlorine atom, a bromine atom, an iodine atom, and the like.

As $X^1$, an alkoxy group is preferable, and a methoxy group and an ethoxy group are more preferable. Three $X^1$'s may be the same as or different from each other.

The compound represented by Formula (A) is a compound that forms the siloxane constitutional unit having Ra in the polyorganosilsesquioxane of the present invention.

Rb in Formula (B) has the same definition as Rb in General Formula (1), and preferred examples thereof are also the same.

$X^2$ in Formula (B) has the same definition as $X^1$ in Formula (A), and preferred examples thereof are also the same. Three $X^2$'s may be the same as or different from each other.

The compound represented by Formula (B) is a compound that forms the siloxane constitutional unit having Rb in the polyorganosilsesquioxane of the present invention.

$Rc_1$ in Formula (C1) has the same definition as Rc in General Formula (1), and preferred examples thereof are also the same.

$Rc_2$ in Formula (C2) has the same definition as the group ($Rc_2$) formed in a case where two Rc's in General Formula (1) are bonded to each other, and preferred examples thereof are also the same.

$Rc_3$ in Formula (C3) has the same definition as the group ($Rc_3$) formed in a case where three Rc's in General Formula (1) are bonded to each other, and preferred examples thereof are also the same.

$X^3$ in Formulas (C1) to (C3) has the same definition as $X^1$ in Formula (A), and preferred examples thereof are also the same. The plurality of $X^3$'s may be the same as or different from each other.

As the hydrolyzable silane compound, hydrolyzable silane compounds other than the compounds represented by Formulas (A), (B) and (C1) to (C3) may be used in combination. Examples thereof include a hydrolyzable trifunctional silane compound, a hydrolyzable monofunctional silane compound, a hydrolyzable difunctional silane compound, and the like other than the compounds represented by Formulas (A), (B), and (C1) to (C3).

In order to adjust p/q in the polyorganosilsesquioxane of the present invention represented by General Formula (1), a mixing ratio (molar ratio) between the compound represented by Formula (A) and the compound represented by Formula (B) used for manufacturing the polyorganosilsesquioxane may be adjusted.

Specifically, for example, in order to adjust pq to 0.01 to 99, a value represented by the following (Z1) may be set to 0.01 to 99, and a method of hydrolyzing and condensing the compounds may be used to manufacture the polyorganosilsesquioxane.

(Z1)=compound represented by Formula ($A$)(molar amount)/compound represented by Formula ($B$) (molar amount)

Furthermore, In a case where Rc in the polyorganosilsesquioxane of the present invention is derived from $Rc_1$ to $Rc_3$ in the hydrolyzable silane compounds represented by Formulas (C1) to (C3), in order to adjust (p+q)/(p+q+r) in General Formula (1), a mixing ratio (molar ratio) among the compounds represented by Formulas (A), (B) and (C1) to (C3) may be adjusted.

Specifically, for example, in order to adjust $(p+q)_x/(p+q+r)$ to 0.5 to 1.0, a value represented by the following (Z2) may be set to 0.5 to 1.0, and a method of hydrolyzing and condensing these compounds may be used to manufacture the polyorganosilsesquioxane.

(Z2)={compound represented by Formula ($A$)(molar amount)+compound represented by Formula ($B$)(molar amount)}/{compound represented by Formula ($A$)(molar amount)+compound represented by Formula ($B$)(molar amount)+compound represented by Formula ($C1$)(molar amount)+compound represented by Formula ($C2$)(molar amount)×2+compound represented by Formula ($C3$)(molar amount)×3}

The amount of the above hydrolyzable silane compounds used and the composition thereof can be appropriately adjusted according to the desired structure of the polyorganosilsesquioxane of the present invention.

Furthermore, the hydrolysis and condensation reactions of the hydrolyzable silane compounds can be performed simultaneously or sequentially. In a case where the above reactions are sequentially performed, the order of performing the reactions is not particularly limited.

The hydrolysis and condensation reactions of the hydrolyzable silane compounds can be carried out in the presence or absence of a solvent, and are preferably carried out in the presence of a solvent.

Examples of the solvent include aromatic hydrocarbons such as benzene, toluene, xylene, and ethylbenzene; ethers such as diethyl ether, dimethoxyethane, tetrahydrofuran, and dioxane: ketones such as acetone, methyl ethyl ketone, and methyl isobutyl ketone; esters such as methyl acetate, ethyl acetate, isopropyl acetate, and butyl acetate; amides such as N,N-dimethylformamide and N,N-dimethylacetamide; nitriles such as acetonitrile, propionitrile, and benzonitrile; alcohols such as methanol, ethanol, isopropyl alcohol, and butanol, and the like.

As the solvent, ketones or ethers are preferable. One kind of solvent can be used singly, or two or more kinds of solvents can be used in combination.

The amount of the solvent used is not particularly limited, and can be appropriately adjusted according to the desired reaction time or the like such that the amount falls into a range of 0 to 2,000 parts by mass with respect to the total amount (100 parts by mass) of the hydrolyzable silane compounds.

The hydrolysis and condensation reactions of the hydrolyzable silane compounds is preferably performed in the presence of a catalyst and water. The catalyst may be an acid catalyst or an alkali catalyst.

Examples of the acid catalyst include mineral acids such as hydrochloric acid, sulfuric acid, nitric acid, phosphoric acid, and boric acid; phosphoric acid esters carboxylic acids such as acetic acid, formic acid, and trifluoroacetic acid; sulfonic acids such as methanesulfonic acid, trifluoromethanesulfonic acid, and p-toluenesulfonic acid; solid acids such as activated clay; Lewis acids such as iron chloride, and the like.

Examples of the alkali catalyst include alkali metal hydroxides such as lithium hydroxide, sodium hydroxide, potassium hydroxide, and cesium hydroxide; alkali earth metal hydroxides such as magnesium hydroxide, calcium hydroxide, and barium hydroxide; alkali metal carbonate such as lithium carbonate, sodium carbonate, potassium carbonate, and cesium carbonate; alkali earth metal carbonates such as magnesium carbonate; alkali metal hydrogen carbonates such as lithium hydrogen carbonate, sodium hydrogen carbonate, potassium hydrogen carbonate, and cesium hydrogen carbonate; alkali metal organic acid salts (for example, acetate) such as lithium acetate, sodium acetate, potassium acetate, and cesium acetate; alkali earth metal organic acid salts (for example, acetate) such as magnesium acetate, alkali metal alkoxides such as lithium methoxide, sodium methoxide, sodium ethoxide, sodium isopropoxide, potassium ethoxide, and potassium t-butoxide: alkali metal phenoxides such as sodium phenoxide: amines (tertiary amines and the like) such as triethylamine, N-methylpiperidine, 1,8-diazabicyclo[5.4.0]undec-7-ene, and 1,5-diazabicyclo[4.3.0]non-5-ene; nitrogen-containing aromatic heterocyclic compounds such as pyridine, 2,2'-bipyridyl, and 1,10-phenanthroline, and the like.

One kind of catalyst can be used singly, or two or more kinds of catalysts can be used in combination. Furthermore, the catalyst can be used in a state of being dissolved or dispersed in water, a solvent, or the like.

The amount of the catalyst used is not particularly limited, and can be appropriately adjusted within a range of 0.002 to 0.200 mol with respect to the total amount (1 mol) of the hydrolyzable silane compounds.

The amount of water used in the above hydrolysis and condensation reactions is not particularly limited, and can be appropriately adjusted within a range of 0.5 to 20 mol with respect to the total amount (1 mol) of the hydrolyzable silane compounds.

The method of adding water is not particularly limited. The entirety of water to be used (total amount of water to be used) may be added at once or added sequentially. In a case where water is added sequentially, the water may be added continuously or intermittently.

The reaction temperature of the hydrolysis and condensation reactions is, for example, 40° C. to 100° C. and preferably 45° C. to 80° C. The reaction time of the hydrolysis and condensation reactions is, for example, 0.1 to 10 hours and preferably 1.5 to 8 hours. Furthermore, the hydrolysis and condensation reactions can be carried out under normal pressure or under pressure that is increased or reduced. The hydrolysis and condensation reactions may be performed, for example, in any of a nitrogen atmosphere, an inert gas atmosphere such as argon gas atmosphere, or an aerobic atmosphere such as an air atmosphere. Among these, the inert gas atmosphere is preferable.

By the hydrolysis and condensation reactions of the hydrolyzable silane compounds described above, the polyorganosilsesquioxane of the present invention is obtained. After the hydrolysis and condensation reactions are finished, it is preferable to neutralize the catalyst so as to inhibit the polymerization of the (meth)acryloyl group and the ring opening of the epoxy group. In addition, the polyorganosilsesquioxane of the present invention may be separated and purified by a separation method such as rinsing, acid cleaning, alkali cleaning, filtration, concentration, distillation, extraction, crystallization, recrystallization, or column chromatography, or by a separation method using these in combination.

For forming the hardcoat layer, one kind of polyorganosilsesquioxane described above may be used singly, or two or more kinds of polyorganosilsesquioxanes described above having different structures may be used in combination.

The content rate of the cured product of the polyorganosilsesquioxane with respect to the total mass of the hardcoat layer is preferably 50% by mass to 100% by mass, more preferably 50% by mass to 99.9% by mass, even more preferably 70% by mass to 99.5% by mass, and particularly preferably 90% by mass to 99.0% by mass.

—Other Additives—

The hardcoat layer may contain components other than the above. The hardcoat layer may contain, for example, a dispersant, a leveling agent, an antifouling agent, and the like.

(Film Thickness)

The film thickness of the hardcoat layer is not particularly limited, but is preferably 1 to 50 µm, more preferably 3 to 30 µm, and even more preferably 5 to 20 µm.

<Substrate>

The substrate of the hardcoat film according to the embodiment of the present invention will be described.

The transmittance of the substrate in a visible light region is preferably equal to or higher than 70%, and more preferably equal to or higher than 80%.

The substrate preferably includes a polymer resin. That is, the substrate is preferably a plastic substrate.

(Polymer Resin)

As the polymer resin, a polymer excellent in optical transparency, mechanical strength, heat stability, and the like is preferable.

Examples of such a polymer include polycarbonate-based polymers, polyester-based polymers such as polyethylene terephthalate (PET) and polyethylene naphthalate (PEN), styrene-based polymers such as polystyrene and an acrylonitrile/styrene copolymer (AS resin), and the like. The examples also include polyolefins such as polyethylene and polypropylene, norbornene-based resins, polyolefin-based polymers such as ethylene/propylene copolymers, vinyl chloride-based polymers, amide-based polymers such as nylon and aromatic polyamide, imide-based polymers, sulfone-based polymers, polyether sulfone-based polymers, polyether ether ketone-based polymers, polyphenylene sulfide-based polymers, vinylidene chloride-based polymers, vinyl alcohol-based polymers, vinyl butyral-based polymers, arylate-based polymers, polyoxymethylene-based polymers, epoxy-based polymers, cellulose-based polymers represented by triacetyl cellulose, copolymers of the above polymers, and polymers obtained by mixing together the above polymers.

Particularly, amide-based polymers such as aromatic polyamide and imide-based polymers can be preferably used as the substrate, because the number of times of folding at break measured for these polymers by an MIT tester according to JIS P8115 (2001) is large, and these polymers have relatively high hardness. For example, the aromatic polyamide described in Example 1 of JP5699454B and the polyimides described in JP2015-508345A and JP2016-521216A can be preferably used as the substrate.

The substrate can also be formed as a cured layer of an ultraviolet curable resin or a thermosetting resin based on acryl, urethane, acrylic urethane, epoxy, silicone, and the like.

(Softening Material)

The substrate may contain a material that further softens the polymer resin described above. The softening material refers to a compound that improves the number of times of folding at break. As the softening material, it is possible to use a rubber elastic material, a brittleness improver, a plasticizer, a slide ring polymer, and the like.

Specifically, as the softening material, the softening materials described in paragraphs "0051" to "0114" of JP2016-167043A can be suitability used.

The softening material may be mixed alone with the polymer resin, or a plurality of softening materials may be appropriately used in combination. Furthermore, the substrate may be prepared using one kind of softening material or a plurality of softening materials without being mixed with the resin.

The amount of the softening material mixed is not particularly limited as long as Equation (1) of JP2016-167043A is satisfied in a case where 10 parts by mass of the softening material is mixed with 100 parts by mass of the polymer resin. That is, a polymer resin having the sufficient number of times of folding at break may be used alone as the substrate of the film or may be mixed with the softening material, or the substrate may be totally (100%) composed of the softening material such that the number of times of folding at break becomes sufficient.

(Other Additives)

Various additives (for example, an ultraviolet absorber, a matting agent, an antioxidant, a peeling accelerator, a retardation (optical anisotropy) regulator, and the like) can be added to the substrate according to the use. These additives may be solids or oily substances. That is, the melting point or boiling point thereof is not particularly limited. In addition, the additives may be added at any point in time in the step of preparing the substrate, and a step of preparing a material by adding additives may be added to a material preparation step. Furthermore, the amount of each material added is not particularly limited as long as each material performs its function.

As those other additives, the additives described in paragraphs "0117" to "0122" of JP2016-167043A can be suitably used.

One kind of each of the above additives may be used singly, or two or more kinds of the above additives can be used in combination.

From the viewpoint of transparency, it is preferable that the difference between a refractive index of the softening material and various additives used in the substrate and a refractive index of the polymer resin is small.

(Thickness of Substrate)

The thickness of the substrate is more preferably equal to or smaller than 100 µm, even more preferably equal to or smaller than 60 µm, and most preferably equal to or smaller than 50 µm. In a case where the substrate has a small thickness, the difference in curvature between the front surface and the back surface of the folded substrate is reduced. Therefore, cracks and the like hardly occur, and the substrate is hardly broken even being folded plural times. On the other hand, from the viewpoint of ease of handling of the substrate, the thickness of the substrate is preferably equal to or greater than 10 μm, and more preferably equal to or greater than 15 μm. From the viewpoint of reducing the thickness of the image display device into which the optical film is to be incorporated, the total thickness of the optical film is preferably equal to or smaller than 70 μm, and more preferably equal to or smaller than 50 μm.

(Method for Preparing Substrate)

The substrate may be prepared by heat-melting a thermoplastic polymer resin, or may be prepared from a solution, in which a polymer is uniformly dissolved, by solution film formation (a solvent casting method). In the case of heat-melting film formation, the softening material and various additives described above can be added during heat melting.

In contrast, in a case where the substrate is prepared by the solution film formation method, the softening material and various additives described above can be added to the polymer solution (hereinafter, also referred to as dope) in each preparation step. Furthermore, the softening material and various additives may be added at any point in time in a dope preparation process. In the dope preparation process, a step of preparing the dope by adding the additives may be additionally performed as a final preparation step.

<Anti-Scratch Layer>

The hardcoat film according to the embodiment of the present invention has an anti-scratch layer.

The anti-scratch layer is preferably provided on the outermost surface of the hardcoat film that is opposite to the substrate of the hardcoat layer. In a case where the anti-scratch layer is provided as described above, the rub resistance can be improved.

The anti-scratch layer contains a cured product of a compound having two or more (meth)acryloyl groups (a (meth)acrylic compound having two or more functional groups) in one molecule. The cured product of the (meth) acrylic compound having two or more functional groups that is contained in the anti-scratch layer is preferably a polymer (a cured product) obtained by polymerizing a (meth)acrylic compound having two or more functional groups by the irradiation of ionizing radiation or by heating.

Examples of the (meth)acrylic compound having two or more functional groups include esters of a polyhydric alcohol and a (meth)acrylic acid. Specifically, examples thereof include pentaerythritol tri(meth)acrylate, pentaerythritol tetra(meth)acrylate, trimethylolpropane tri(meth)acrylate, trimethylolethane tri(meth)acrylate, ditrimethylolpropane tetra(meth)acrylate, dipentaerythritol tetra(meth)acrylate, dipentaerythritol pentaacrylate, dipentaerythritol hexaacrylate, pentaerythritol hexa(meth)acrylate, and the like. In view of high degree of crosslinking, pentaerythritol triacrylate, pentaerythritol tetraacrylate, dipentaerythritol pentaacrylate, dipentaerythritol hexaacrylate, or a mixture of these is preferable.

The (meth)acrylic compound having two or more functional groups is more preferably a (meth)acrylic compound having three or more functional groups. In a case where the compound has three or more crosslinking groups in one molecule, a dense three-dimensional crosslinked structure is easily formed. Therefore, even though the equivalent of crosslinking groups (acrylic equivalent) of the used compound is small, the indentation hardness of the anti-scratch layer can be increased. The indentation hardness of the anti-scratch layer is preferably equal to or higher than 300 MPa.

The (meth)acrylic compound having two or more functional groups may be a crosslinkable monomer, a crosslinkable oligomer, or a crosslinkable polymer.

As the crosslinkable oligomer or the crosslinkable polymer, from the viewpoint of adhesiveness with the hardcoat layer and the folding resistance, polysilsesquioxane containing a (meth)acryl group represented by General Formula (2) is particularly preferable.

(2)

In General Formula (2). Ra represents a group containing a (meth)acryloyl group, and Rc represents a monovalent substituent, t and u represent a proportion of Ra and Rc in General Formula (2) respectively, t+u=100, t is greater than 0, and u is equal to or greater than 0. In a case where there are a plurality of Ra's and a plurality of Rc's in General Formula (2), the plurality of Ra's may be the same as or different from each other and the plurality of Rc's may be the same as or different from each other. In a case where there is a plurality of Rc's in General Formula (2), the plurality of Rc's may form a bond with each other.

The group containing a (meth)acryloyl group represented by Ra and the monovalent group represented by Rc in General Formula (2) have the same definitions as Ra and Rc in General Formula (1) respectively, and groups preferable as Ra and Rc are also the same.

[$SiO_{1.5}$] in General Formula (2) represents a structural portion composed of a siloxane bond (Si—O—Si) in the polyorganosilsesquioxane.

The structural portion represented by [$SiO_{1.5}$] in General Formula (2) is not particularly limited and may be any of a random structure, a ladder structure, or a cage structure. From the viewpoint of pencil hardness, it is preferable that the compound contains many ladder structures. In a case where the ladder structure is formed, the deformation recovery of the hardcoat film can be excellently maintained.

In General Formula (2), t is greater than 0, and u is equal to or greater than 0.

t/(t+u) is preferably 0.5 to 1.0. In a case where the amount of the groups represented Ra is equal to or greater than 50% of the total amount of the groups represented by Ra or Rc included in the polyorganosilsesquioxane represented by General Formula (2), crosslinks are sufficiently formed between the polyorganosilsesquioxane molecules, and thus the rub resistance can be excellently maintained.

t/(t+u) is more preferably 0.7 to 1.0, even more preferably 0.9 to 1.0, and particularly preferably 0.95 to 1.0.

It is also preferable that there is a plurality of Rc's in General Formula (2), and the plurality of Rc's form a bond with each other. In this case, u/(t+u) is preferably 0.005 to 0.20.

u/(t+u) is more preferably 0.005 to 0.10, even more preferably 0.005 to 0.05, and particularly preferably 0.005 to 0.025.

The number-average molecular weight (Mn) of the polyorganosilsesquioxane represented by General Formula (2) that is calculated by gel permeation chromatography (GPC) and expressed in terms of standard polystyrene is preferably 500 to 6,000, more preferably 1,000 to 4,500, and even more preferably 1,500 to 3,000.

The molecular weight dispersity (Mw/Mn) of the polyorganosilsesquioxane represented by General Formula (2) that is measured by GPC and expressed in terms of standard polystyrene is, for example, 1.0 to 4.0, preferably 1.1 to 3.7, more preferably 1.1 to 3.0, even more preferably 1.1 to 2.5, and particularly preferably 1.45 to 1.80. Mn represents a number-average molecular weight.

The content rate of the cured product of the (meth)acrylic compound having two or more functional groups with respect to the total mass of the anti-scratch layer is preferably equal to or higher than 80% by mass, more preferably equal to or higher than 85% by mass, and even more preferably equal to or higher than 89% by mass.

—Other Additives—

The anti-scratch layer may contain components other than the above. For example, the anti-scratch layer may contain a dispersant, a leveling agent, an antifouling agent, and the like. Particularly, it is preferable that the anti-scratch layer contains, as a slip agent, a fluorine-containing compound or a cured product of a fluorine-containing compound described below.

[Fluorine-Containing Compound and Cured Product of Fluorine-Containing Compound]

The fluorine-containing compound may be any of a monomer, an oligomer, or a polymer. The fluorine-containing compound preferably has substituents that contribute to the bond formation or compatibility of the compound with the (meth)acrylic compound having two or more functional groups in the anti-scratch layer. These substituents may be the same as or different from each other. It is preferable that the compound has a plurality of such substituents.

The substituents are preferably polymerizable groups, and may be polymerizable reactive groups showing any of radical polymerization properties, polycondensation perperties, cationic polymerization properties, anionic polymerization properties, and addition polymerization properties. As the substituents, for example, an acryloyl group, a methacryloyl group, a vinyl group, an allyl group, a cinnamoyl group, an epoxy group, an oxetanyl group, a hydroxyl group, a polyoxyalkylene group, a carboxyl group, an amino group, and the like are preferable. Among these, radically polymerizable groups are preferable, and particularly, an acryloyl group and a methacryloyl group are preferable.

The fluorine-containing compound may be a polymer or an oligomer with a compound having no fluorine atom.

The fluorine-containing compound is preferably a fluorine-based compound represented by General Formula (F).

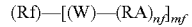  General Formula (F):

(In the formula, Rf represents a (per)fluoroalkyl group or a (per)fluoropolyether group, W represents a single bond or a linking group, and RA represents a polymerizable unsaturated group. nf represents an integer of 1 to 3. mf represents an integer of 1 to 3.)

In General Formula (F), RA represents a polymerizable unsaturated group. The polymerizable unsaturated group is preferably a group having an unsaturated bond capable of causing a radical polymerization reaction by being irradiated with active energy rays such as ultraviolet or electron beams (that is, the polymerizable unsaturated group is preferably a radically polymerizable group). Examples thereof include a (meth)acryloyl group, a (meth)acryloyloxy group, a vinyl group, an allyl group, and the like. Among these, a (meth)acryloyl group, a (meth)acryloyloxy group, and groups obtained by substituting any hydrogen atom in these groups with a fluorine atom are preferably used.

In General Formula (F), Rf represents a (per)fluoroalkyl group or a (per)fluoropolyethergroup.

The (per)fluoroalkyl group represents at least either a fluoroalkyl group or a perfluoroalkyl group, and the (per)fluoropolyether group represents at least either a fluoropolyether group or a perfluoropolyether group. From the viewpoint of rub resistance, it is preferable that the fluorine content rate in Rf is high.

The (per)fluoroalkyl group is preferably a group having 1 to 20 carbon atoms, and more preferably a group having 1 to 10 carbon atoms.

The (per)fluoroalkyl group may be a linear structure (for example, $-CF_2CF_3$, $-CH_2(CF_2)_4H$, $-CH_2(CF_2)_8CF_3$, $-CH_2CH_2(CF_2)_4H$), a branched structure (for examples, $-CH(CF_3)_2$, $-CH_2CF(CF)_2-CH(CH_3)CF_2CF_3$, $-CH(CH_3)(CF_2)_5CF_2H$) or an alicyclic structure (preferably a 5- or 6-membered ring, for example, a perfluorocyclohexyl group, a perfluorocyclopentyl group, and an alkyl group substituted with these groups).

The (per)fluoropolyether group refers to a (per)fluoroalkyl group having an ether bond, and may be a monovalent group or a group having a valence of equal to or higher than 2. Examples of the fluoropolyether group include $-CH_2OCH_2CF_2CF_3$, $-CH_2CH_2OCH_2C_4F_8H$, $-CH_2CH_2OCH_2CH_2C_8F_{17}$, $-CH_2CH_2OCF_2CF_2OCF_2CF_2H$, a fluorocycloalkyl group having 4 to 20 carbon atoms with four or more fluorine atoms, and the like. Examples of the perfluoropolyether group include $-(CF_2O)_{pf}-(CF_2CF_2O)_{qf}-$, $-[CF(CF_3)CF_2O]_{pf}-[CF(CF_3)]_{qf}-$, $-(CF_2CF_2CF_2O)_{pf}-$, $-(CF_2CF_2O)_{pf}-$, and the like.

pf and qf each independently represent an integer of 0 to 20. Here, pf+qf is an integer equal to or greater than 1.

The sum of pf and qf is preferably 1 to 83, more preferably 1 to 43, and even more preferably 5 to 23.

From the viewpoint of excellent rub resistance, the fluorine-containing compound particularly preferably has a perfluoropolyether group represented by $-(CF_2O)pf-(CF_2CF_2O)qf-$.

In the present invention, the fluorine-containing compound preferably has a perfluoropolyether group and has a plurality of polymerizable unsaturated groups in one molecule.

In General Formula (F), W represents a linking group. Examples of W include an alkylene group, an arylene group, a heteroalkylene group, and a linking group obtained by combining these groups. These linking groups may further have an oxy group, a carbonyl group, a carbonyloxy group, a carbonylimino group, a sulfonamide group, and a functional group obtained by combining these groups.

W is preferably an ethylene group, and more preferably an ethylene group bonded to a carbonylimino group.

The content of fluorine atoms in the fluorine-containing compound is not particularly limited, but is preferably equal to or greater than 20% by mass, more preferably 30% to 70% by mass, and even more preferably 40% to 70% by mass.

As the fluorine-containing compound, for example, R-2020, M-2020, R-3833, M-3833, and OPTOOL DAC (trade names) manufactured by DAIKIN INDUSTRIES, LTD, and MEGAFACE F-171 F-172, F-179A, RS-78, RS-90, and DEFENSA MCF-300 and MCF-323 (trade names) manufactured by DIC Corporation are preferable, but the fluorine-containing compound is not limited to these.

From the viewpoint of rub resistance, in General Formula (F), the product of nf and mf (nf×mf) is preferably equal to or greater than 2, and more preferably equal to or greater than 4.

(Molecular Weight of Fluorine-Containing Compound)

The weight-average molecular weight (Mw) of the fluorine-containing compound having a polymerizable unsaturated group can be measured using molecular exclusion chromatography, for example, gel permeation chromatography (GPC).

Mw of the fluorine-containing compound used in the present invention is preferably equal to or greater than 400 and less than 50,000, more preferably equal to or greater than 400 and less than 30,000, and even more preferably equal to or greater than 400 and less than 25,000.

(Amount of Fluorine-Containing Compound Added)

The amount of the fluorine-containing compound added with respect to the total mass of the anti-scratch layer is preferably 0.1% to 10% by mass, more preferably 0.5% to 10% by mass, even more preferably 1% to 10% by mass, and particularly preferably 5% to 10% by mass.

(Film Thickness)

The film thickness of the anti-scratch layer is 0.05 to 5 µm. In a case where the film thickness of the anti-scratch layer is equal to or greater than 0.05 µm, the formation of the anti-scratch layer brings about a rub resistance improving effect. In a case where the film thickness of the anti-scratch layer is equal to or smaller than 5 µm, the resistance of the film to repeated folding can be maintained.

The film thickness of the anti-scratch layer is preferably 50 nm to 5 µm, more preferably 100 nm to 3 µm, and even more preferably 200 nm to 1.5 µm.

<Other Layers>

The hardcoat film according to the embodiment of the present invention may have other layers in addition to the hardcoat layer and the anti-scratch layer.

Examples of those other layers include an antireflection layer and the like.

[Method for Manufacturing Hardcoat Film]

The method for manufacturing a hardcoat film according to an embodiment of the present invention will be described.

The method for manufacturing a hardcoat film according to the embodiment of the present invention is preferably a manufacturing method including the following steps (I) to (IV).

(I) Step of coating a substrate with a composition for forming a hardcoat layer including the aforementioned polyorganosilsesquioxane so as to form a coating film (i) on the substrate (II) Step of performing a curing treatment on the coating film so as to form a hardcoat layer (III) Step of coating the hardcoat layer with a composition for forming an anti-scratch layer including a (meth)acrylic compound having two or more functional groups so as to form a coating film (ii) on the hardcoat layer (IV) Step of performing a curing treatment on the coating film (ii) so as to form an anti-scratch layer <Step (I)>

The step (I) is a step of coating a substrate with a composition for forming a hardcoat layer including the aforementioned polyorganosilsesquioxane so as to form a coating film on the substrate.

The substrate is as described above.

The composition for forming a hardcoat layer is a composition for forming the hardcoat layer described above.

The composition for forming a hardcoat layer is generally in the form of a liquid.

Furthermore, the composition for forming a hardcoat layer is preferably prepared by dissolving or dispersing the aforementioned polyorganosilsesquioxane and, if necessary, various additives and a polymerization initiator in an appropriate solvent. At this time, the concentration of solid contents is generally about 10% to 90% by mass, preferably 20% to 80% by mass, and particularly preferably about 40% to 70% by mass.

(Polymerization Initiator)

The polyorganosilsesquioxane has a radically polymerizable group {(meth)acryloyl group} and a cationically polymerizable group (epoxy group). In order that the polymerization reactions of these polymerizable groups polymerized in different ways are initiated by light irradiation, the composition for forming a hardcoat layer may include a radical photopolymerization initiator and a cationic photopolymerization initiator. One kind of radical photopolymerization initiator may be used singly, or two or more kinds of radical photopolymerization initiators having different structures may be used in combination. This point is also applied to the cationic photopolymerization initiator.

Hereinafter, each of the photopolymerization initiators will be described in order.

(Radical Photopolymerization Initiator)

As the radical photopolymerization initiator, known radical photopolymerization initiators can be used without particular limitation, as long as the initiators can generate radicals as active species by light irradiation. Specific examples thereof include acetophenones such as diethoxyacetophenone, 2-hydroxy-2-methyl-1-phenylpropan-1-one, benzyl dimethyl ketal, 4-(2-hydroxyethoxy)phenyl-(2-hydroxy-2-propyl)ketone, 1-hydroxycyclohexyl phenyl ketone, 2-methyl-2-morpholino(4-thiomethylphenyl)propan-1-one, 2-benzyl-2-dimethylamino-1-(4-morpholinophenyl)-1-butanone, a 2-hydroxy-2-methyl-1-[4-(1-methylvinyl)phenyl]propane oligomer, and 2-hydroxy-1-{4-[4-(2-hydroxy-2-methyl-propionyl)-benzyl]phenyl}-2-methyl-propan-1-one; oxime esters such as 1,2-octanedione, 1[4-(phenylthio)-,2-(O-benzyloxime)], ethanone, 1-[9-ethyl-6-(2-methylbenzoyl)-9H-carbazol-3-yl]-,1-(0-acetyloxime); benzoins such as benzoin, benzoin methyl ether, benzoin ethyl ether, benzoin isopropyl ether, and benzoin isobutyl ether; benzophenones such as benzophenone, methyl o-benzoyl benzoate, 4-phenylbenzophenone, 4-benzoyl-4'-methyl-diphenyl sulfide, 3,3',4,4'-tetra(t-butylperoxycarbonyl)benzophenone, 2,4,6-trimethylbenzophenone, 4-benzoyl-N,N-dimethyl-N-[2-(1-oxo-2-propenyloxy) ethyl]benzenemethanaminium bromide, and (4-benzoylbenzyl)trimethyl ammonium chloride: thioxanthones such as 2-isopropylthioxanthone, 4-isopropylthioxanthone, 2,4-diethylthioxanthone, 2,4-dichlorothioxanthone, 1-chloro-4-propoxythioxanthone, and 2-(3-dimethylamino-2-hydroxy)-3,4-dimethyl-9H-thioxanthone-9-one methochloride; acylphosphine oxides such as 2,4,6-trimethylbenzoyl-diphenylphosphine oxide, bis(2,6-dimethoxybenzoyl)-2,4,4-trimethyl-pentylphosphine oxide, and bis(2,4,6-trimethylbenzoyl)-phenylphosphine oxide; and the like. Furthermore, as an aid for the radical photopolymerization initiator, triethanolamine, triisopropanolamine, 4,4'-dimethylaminobenzophenone (Michler's ketone), 4,4'-diethylaminobenzophenone, 2-dimethylaminoethyl benzoate, ethyl 4-dimethylaminobenzoate, (n-butoxy)ethyl 4-dimethylaminobenzoate, isoamyl 4-dimethylaminobenzoate, 2-ethylhexyl 4-dimethylaminobenzoate, 2,4-diethylthioxanthone, 2,4-diisopropylthioxanthone, and the like may be used in combination.

The above radical photopolymerization initiators and aids can be synthesized by a known method or are available as commercial products.

The content of the radical photopolymerization initiator in the composition for forming a hardcoat layer is not particularly limited and may be appropriately adjusted within a range in which the polymerization reaction (radical polymerization) of the polyorganosilsesquioxane excellently proceeds. The content of the radical photopolymerization initiator with respect to 100 parts by mass of the polyorganosilsesquioxane included in the composition is, for example, in a range of 0.1 to 20 parts by mass, preferably 0.5 to 10 parts by mass, and more preferably in a range of 1 to 10 parts by mass.

(Cationic Photopolymerization Initiator)

As the cationic photopolymerization initiator, known cationic photopolymerization initiators can be used without particular limitation, as long as the initiators can generate cations as active species by light irradiation. Specific examples thereof include known sulfonium salts, ammonium salts, iodonium salts (for example, diaryliodonium salts), triarylsulfonium salts, diazonium salts, iminium salts, and the like. More specifically, examples thereof include the cationic photopolymerization initiators represented by Formulas (25) to (28) described in paragraphs "0050" to "0053" of JP1996-143806A (JP-H08-143806A), the compounds exemplified as cationic polymerization catalysts in paragraph "0020" of JP1996-283320A (JP-H08-283320A), and the like. The cationic photopolymerization initiator can be synthesized by a known method or is available as a commercial product. Examples of the commercial product include CI-1370, CI-2064, CI-2397, CI-2624, CI-2639, CI-2734, CI-2758, CI-2823, CI-2855, CI-5102, and the like manufactured by NIPPON SODA CO., LTD., PHOTOINITIATOR 2047 and the like manufactured by Rhodia, UVI-6974 and UVI-6990 manufactured by Union Carbide Corporation, CPI-10P manufactured by San-Apro Ltd., and the like.

As the cationic photopolymerization initiator, in view of the sensitivity of the photopolymerization initiator with respect to light, the compound stability, and the like, a diazonium salt, an iodonium salt, a sulfonium salt, and an iminium salt are preferable. In view of weather fastness, an iodonium salt is most preferable.

Specific examples of commercial products of the iodonium salt-based cationic photopolymerization initiator include B2380 manufactured by TOKYO CHEMICAL INDUSTRY CO., LTD., BBI-102 manufactured by Midori Kagaku Co., Ltd., WPI-113, WPI-124, WPI-169, and WPI-170 manufactured by Wako Pure Chemical Industries, Ltd., and DTBPI-PFBS manufactured by Toyo Gosei Co., Ltd.

In addition, specific examples of the iodonium salt compound that can be used as the cationic photopolymerization initiator include the following compounds FK-1 and FK-2.

Cationic Photopolymerization Initiator (Iodonium Salt Compound) FK-1

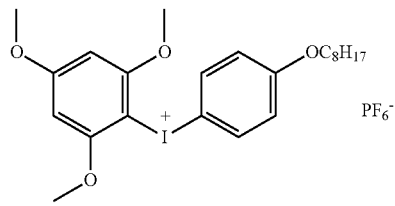

Cationic Photopolymerization Initiator (Iodonium Salt Compound) FK-2

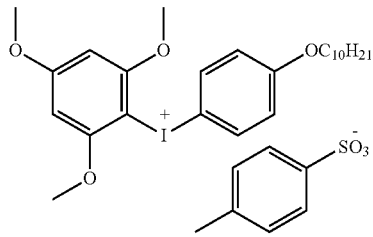

The content of the cationic photopolymerization initiator in the composition for forming a hardcoat layer is not particularly limited and may be appropriately adjusted within a range in which the polymerization reaction (cationic polymerization) of the polyorganosilsesquioxane excellently proceeds. The content of the cationic photopolymerization initiator with respect to 100 parts by mass of the polyorganosilsesquioxane is, for example, in a range of 0.1 to 200 parts by mass, preferably 1 to 150 parts by mass, and more preferably in a range of 2 to 100 parts by mass.

<Optional Components>

The composition for forming a hardcoat layer may further include one or more kinds of optional components in addition to the polyorganosilsesquioxane and the polymerization initiators described above. Specific examples of the optional components include a solvent and various additives.

(Solvent)

As the solvent that can be included as an optional component, an organic solvent is preferable. One kind of organic solvent can be used singly, or two or more kinds of organic solvents can be used by being mixed together at any ratio. Specific examples of the organic solvent include alcohols such as methanol, ethanol, propanol, n-butanol, and i-butanol; ketones such as acetone, methyl isobutyl ketone, methyl ethyl ketone, and cyclohexanone; cellosolves such as ethyl cellosolve; aromatic solvents such as toluene and xylene; glycol ethers such as propylene glycol monomethyl ether; acetic acid esters such as methyl acetate, ethyl acetate, and butyl acetate; diacetone alcohol: and the like. The amount of the solvent in the aforementioned composition can be appropriately adjusted within a range in which the coating suitability of the composition can be ensured. For example, the amount of the solvent added with respect to the total amount (100 parts by mass) of the polyorganosilsesquioxane and the polymerization initiators can be 50 to 500 parts by mass, and preferably can be 80 to 200 parts by mass.

(Additives)

If necessary, the aforementioned composition can optionally include one or more kinds of known additives. Examples of such additives include a surface conditioner, a leveling agent, a polymerization inhibitor, and the like. For details of these, for example, paragraphs "0032" to "0034" of JP2012-229412A can be referred to. However, the additives are not limited to these, and it is possible to use various additives that can be generally used in a polymerizable composition. Furthermore, the amount of the additives added to the composition is not particularly limited and may be appropriately adjusted.

<Method of Preparing Composition>

The composition for forming a hardcoat layer used in the present invention can be prepared by simultaneously mixing together the various components described above or sequentially mixing together the various components described above in any order. The preparation method is not particularly limited, and the composition can be prepared using a known stirrer or the like.

As the method of coating a substrate with the composition for forming a hardcoat layer, known methods can be used without particular limitation. Examples thereof include a dip coating method, an air knife coating method, a curtain coating method, a roller coating method. a wire bar coating method, a gravure coating method, a die coating method, and the like.

<Step (II)>

The step (II) is a step of performing a curing treatment on the coating film (i) so as to form a hardcoat layer.

The coating film is preferably cured by radiating ionizing radiation to the coating film side or cured by heat.

The type of ionizing radiation is not particularly limited, and examples thereof include X-rays, electron beams, ultraviolet, visible light, infrared, and the like. Among these, ultraviolet is preferably used. For example, in a case where the coating film can be cured by ultraviolet, it is preferable to irradiate the coating film with ultraviolet from an ultraviolet lamp at an irradiation dose of 10 m/cm$^2$ to 1,000 mJ/cm$^2$ such that the curable compound is cured. The irradiation dose is more preferably 50 mJ/cm$^2$ to 1,000 m/cm$^2$, and even more preferably 100 mJ/cm$^2$ to 500 mJ/cm$^2$. As the ultraviolet lamp, a metal halide lamp, a high-pressure mercury lamp, or the like is suitably used.

In a case where the coating film is cured by heat, the temperature is not particularly limited, but is preferably equal to or higher than 80° C. and equal to or lower than 200° C., more preferably equal to or higher than 100° C. and equal to or lower than 180° C., and even more preferably equal to or higher than 120° C. and equal to or lower than 160° C.

The oxygen concentration during curing is preferably 0% to 1.0% by volume, more preferably 0% to 0.1% by volume, and most preferably 0% to 0.05% by volume. In a case where the oxygen concentration during curing is lower than 1.0% by volume, oxygen hardly affects and hinders curing, and thus a hard film is obtained.

For the purpose of bonding the (meth)acryloyl group in the polyorganosilsesquioxane included in the composition for forming a hardcoat layer to the (meth)acrylic compound included in the composition for forming an anti-scratch layer, the curing of the coating film (i) by the irradiation of ionizing radiation in the step (II) is preferably not full curing (by which all (meth)acryloyl groups in the polyorganosilsesquioxane are polymerized) but partial curing (by which some of (meth)acryloyl groups in the polyorganosilsesquioxane remain as unreacted polymerizable groups), and the coating film (i) is preferably fully cured in the step (IV) which will be described later.

In order to partially cure the coating film (i), it is preferable to adjust the irradiation dose of the ionizing radiation. For example, in a case where an ultraviolet lamp is used, the irradiation dose is preferably 2 m/cm$^2$ to 50 m/cm$^2$.

If necessary, at either or both of a stage that follows the step (I) and precedes the step (II) and a stage that follows the step (II) and precedes the step (III), a drying treatment may be performed. The drying treatment can be performed by blowing hot air, disposing the film in a heating furnace, transporting the film in a heating furnace, and the like. The heating temperature is not particularly limited and may be set to a temperature at which the solvent can be dried and removed. The heating temperature means the temperature of hot air or the internal atmospheric temperature of the heating furnace.

<Step (III)>

The step (III) is a step of coating the hardcoat layer with a composition for forming an anti-scratch layer including a (meth)acrylic compound having two or more functional groups so as to form a coating film (ii) on the hardcoat layer.

The composition for forming an anti-scratch layer is a composition for forming the anti-scratch layer described above.

The composition for forming an anti-scratch layer is generally in the form of a liquid. Furthermore, the composition for forming an anti-scratch layer is preferably prepared by dissolving or dispersing the aforementioned (meth)acrylic compound having two or more functional groups and, if necessary, various additives and a polymerization initiator in an appropriate solvent. At this time, the concentration of solid contents is generally about 10% to 90% by mass, preferably 20% to 80% by mass, and particularly preferably about 40% to 70% by mass.

It is preferable that the composition for forming an anti-scratch layer includes, as a polymerization initiator, the radical photopolymerization initiator among the polymerization initiators that can be included in the composition for forming a hardcoat layer described above.

The content of the radical photopolymerization initiator in the composition for forming an anti-scratch layer is not particularly limited and may be appropriately adjusted within a range in which the polymerization reaction (radical polymerization) of the radically polymerizable compound excellently proceeds. In the composition, the content of the radical photopolymerization initiator with respect to 100 parts by mass of the radically polymerizable compound is, for example, in a range of 0.1 to 20 parts by mass, preferably 0.5 to 10 parts by mass, and more preferably in a range of 1 to 10 parts by mass.

In addition, as optional components that can be included in the composition for forming an anti-scratch layer, for example, the optional components that can be included in the composition for forming a hardcoat layer are preferable.

<Step (IV)>

The step (IV) is a step of performing a curing treatment on the coating film (ii) so as to form an anti-scratch layer.

It is preferable that the coating film is cured by radiating the ionizing radiation to the coating film side.

Regarding the type and irradiation dose of the ionizing radiation, the ionizing radiation for curing the coating film (i) in the step (II) can be suitably used, and the irradiation dose of the ionizing radiation in the step (II) can also be preferably used.

In a case where the curing of the coating film (i) in the step (11) is partial curing, it is preferable that the coating films (i) and (II) are fully cured in the step (IV).

In this case, in the step (IV), the unreacted (meth)acryloyl group in the polyorganosilsesquioxane included in the composition for forming a hardcoat layer is bonded to the (meth)acrylic compound included in the composition for forming an anti-scratch layer. Due to the formation of a bond described above, the hardcoat film according to the embodiment of the present invention has a laminated structure having high adhesiveness and thus can exhibit higher rub resistance.

If necessary, at either or both of a stage that follows the step (III) and precedes the step (IV) and a stage that follows the step (IV), a drying treatment may be performed. The drying treatment can be performed by blowing hot air, disposing the film in a heating furnace, transporting the film in a heating furnace, and the like. The heating temperature is not particularly limited and may be set to a temperature at which the solvent can be dried and removed. The heating temperature means the temperature of hot air or the internal atmospheric temperature of the heating furnace.

It is also preferable that the method for manufacturing a hardcoat film includes a step of providing a layer, for example, an antireflection layer, other than the hardcoat layer and the anti-scratch layer.

The present invention also relates to an article having the above hardcoat film according to the embodiment of the present invention described above and an image display device having the hardcoat film according to the embodiment of the present invention described above (preferably an image display device having the hardcoat film according to the embodiment of the present invention as a surface protection film). The hardcoat film according to the embodiment of the present invention is particularly preferably applied to flexible displays in smartphones and the like.

EXAMPLES

Hereinafter, the present invention will be more specifically described using examples, but the scope of the present invention is not limited thereto. Unless otherwise specified, "part" and "%" are based on mass.

(Silane Compound Used for Synthesizing Polyorganosilsesquioxane)

Silane compounds used for synthesizing the polyorganosilsesquioxane used in the present invention are as follows.

—(Meth)Acryloyl Group-Containing Silane Compound—

Compound (A-1): 3-(trimethoxysilyl)propyl acrylate manufactured by TOKYO CHEMICAL INDUSTRY CO., LTD. was used.

Compound (A-2): 3-(trimethoxysilyl)propyl methacrylate manufactured by TOKYO CHEMICAL INDUSTRY CO., LTD. was used.

Compound (A-3): a compound having a trifunctional acryloyl group having the following structure was synthesized by the method described in Chinese Patent NO. CN106279242.

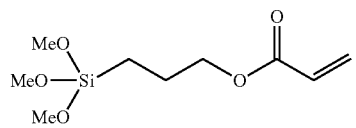

(A-1)

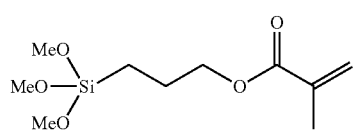

(A-2)

-continued

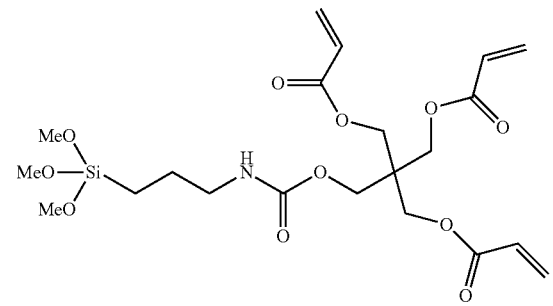

(A-3)

—Epoxy Group-Containing Silane Compound—

Compound (B-1): 2-(3,4-epoxycyclohexyl)ethyltrimethoxysilane manufactured by TOKYO CHEMICAL INDUSTRY CO., LTD. was used.

Compound (B-2): 3-glycidyloxypropyltrimethoxysilane manufactured by TOKYO CHEMICAL INDUSTRY CO., LTD. was used.

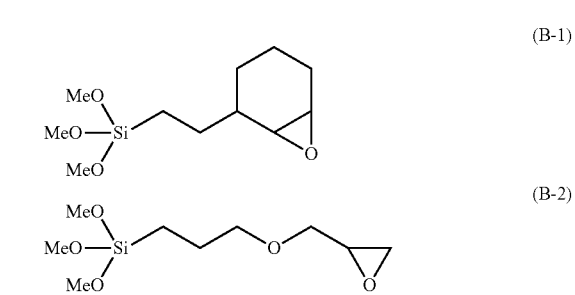

(B-1)

(B-2)

—Other Silane Compounds—

Compound (C-1): 1,6-bis(trimethoxysilyl)hexane manufactured by TOKYO CHEMICAL INDUSTRY CO., LTD. was used.

Compound (C-2): 1,2-bis(trimethoxysilyl)ethane manufactured by TOKYO CHEMICAL INDUSTRY CO., LTD. was used.

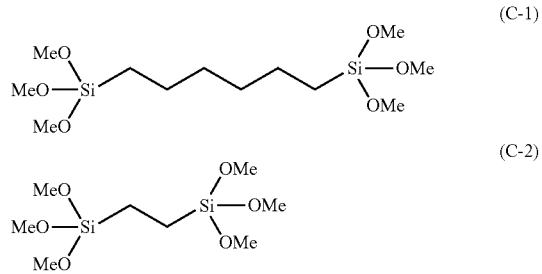

(C-1)

(C-2)

Preparation Example 1

—Synthesis of Polyorganosilsesquioxane (PSQ-1)—

3-(Trimethoxysilyl)propyl acrylate (the compound (A-1), 46.39 g (198 mmol)), 48.78 g (198 mmol) of 2-(3,4-epoxycyclohexyl)ethyltrimethoxysilane (the compound (B-1)), 1.30 g (4.0 mmol) of 1,6-bis(trimethoxysilyl)hexane (the compound (C-1)), and 392 g of acetone were put in a 1 L three-neck flask. While the components were being stirred in a nitrogen atmosphere at 50° C., 11.06 g of a 5% by mass aqueous potassium carbonate solution was added dropwise thereto for 5 minutes. Then, 72.0 g of pure water was added dropwise thereto for 20 minutes, and the mixture was stirred as it was at 50° C. for 5 hours.

After the internal temperature of the flask was returned to room temperature, 400 g of methyl isobutyl ketone (MIBK) and 400 g of 5% by mass saline were added thereto, and the organic layer was extracted. The organic layer was washed with 400 g of 5% by mass saline and then washed twice with 400 g of pure water in this order and concentrated by distillation under reduced pressure, thereby obtaining 76.39 g of a MIBK solution containing 67.1% by mass of the polyorganosilsesquioxane (PSQ-1) (yield: 75%). The weight-average molecular weight (Mw) of the obtained polyorganosilsesquioxane (PSQ-1) was 2,900.

The weight-average molecular weight of the polyorganosilsesquioxane was measured using the following device under the following conditions.

Measurement device: trade name "LC-20AD" (manufactured by Shimadzu Corporation)

Columns: two Shodex KF-801 columns, KF-802, and KF-803 (manufactured by SHOWA DENKO K.K.)

Measurement temperature: 40° C.

Eluent: THF sample concentration of 0.1% to 0.2% by mass

Flow rate: 1 mL/min

Detector: UV-VIS detector (trade name "SPD-20A", manufactured by Shimadzu Corporation)

Molecular weight: expressed in terms of standard polystyrene

Preparation Examples 2 to 4 and Comparative Preparation Examples 1 and 2

MIBK solutions containing polyorganosilsesquioxanes (PSQ-2) to (PSQ-4), (PSQ-1x), and (PSQ-2x) used in examples and comparative examples of the present invention were prepared in the same manner as in Preparation Example 1, except that the silane compounds used and the mixing ratio thereof in Preparation Example 1 were changed as shown in Table 1.

The weight-average molecular weights of the obtained polyorganosilsesquioxanes are also listed in Table 1.

concentration of each component contained in the composition was adjusted as shown in the following Table 2, thereby obtaining a composition 1 for forming a hardcoat layer. In the following Table 2, the content of each of the polyorganosilsesquioxane. IRGACURE 127. CPI-100P. and MEGAFACE F-554 is an amount with respect to the total solid content (all components other than solvents) in the composition 1 for forming a hardcoat layer. The content of MIBK is an amount with respect to the total content of solvents in the composition 1 for forming a hardcoat layer (that is, the content of MIBK shows that MIBK is the only solvent used). The solid content means the total content (concentration of solid contents) of solids with respect to the total mass of the composition 1 for forming a hardcoat layer.

TABLE 2

| Components | Content (% by mass) |
|---|---|
| Polyorganosilsesquioxane | 93.6 |
| IRGACURE 127 | 5 |
| CPI-100P | 1.3 |
| MEGAFACE F-554 | 0.1 |
| MIBK | 100 |
| Solid contents | 50 |

(Preparation of Composition A for Forming Anti-Scratch Layer)

DPHA (mixture of dipentaerythritol pentaacrylate and dipentaerythritol hexaacrylate, manufactured by Nippon Kayaku Co., Ltd.), MEGAFACE RS-90 (antifouling agent, manufactured by DIC Corporation), IRGACURE 127, and methyl ethyl ketone (MEK) were mixed together, and the concentration of thereof adjusted as shown in Table 3.

(Preparation of Compound (A))

In a 1,000 ml flask (reaction vessel) equipped with a thermometer, a stirrer, a reflux condenser, and a nitrogen introduction pipe, 300 mmol (70.3 g) of 3-(acrloyloxy) propyltrimethoxysilane, 7.39 g of triethylamine, and 370 g of methyl isobutyl ketone (MIBK) were mixed together under a nitrogen stream, and 73.9 g of pure water was added dropwise thereto for 30 minutes by using a dropping funnel. The reaction solution was heated to 80° C. such that a polycondensation reaction was carried out under a nitrogen stream for 10 hours.

TABLE 1

| Polyorganosilsesquioxane | Silane compound having (meth)acryloyl group | Silane compound having epoxy group | Other copolymerization components | Mixing ratio (molar ratio) | p/q | (protective layer 2 + q)/ (protective layer 2 + q + r) | Mw |
|---|---|---|---|---|---|---|---|
| PSQ-1 | A-1 | B-1 | C-1 | 49.5:49.5:1 | 1.0 | 0.98 | 2,900 |
| PSQ-2 | A-2 | B-1 | — | 40:60 | 0.67 | 1.0 | 2,550 |
| PSQ-3 | A-3 | B-1 | C-2 | 30:69:1 | 0.43 | 0.98 | 3,650 |
| PSQ-4 | A-1 | B-2 | C-1 | 58:40:2 | 1.45 | 0.96 | 4,700 |
| PSQ-1x | A-1 | — | — | — | — | — | 2,700 |
| PSQ-2x | — | B-2 | — | — | — | — | 3,900 |

Example 1

(Preparation of Composition 1 for Forming Hardcoat Layer)

CPI-100P (cationic photopolymerization initiator, manufactured by San-Apro Ltd.), IRGACURE 127 (radical photopolymerization initiator, manufactured by BASF SE), MEGAFACE F-554 (leveling agent, manufactured by DIC Corporation), and MIBK were added to the MIBK solution containing the polyorganosilsesquioxane (PSQ-1) obtained in the synthesis example described above such that the Thereafter, the reaction solution was cooled, 300 g of a 5% by mass saline was added thereto, and the organic layer was extracted. The organic layer was washed with 300 g of 5% by mass saline and washed twice with 300 g of pure water in this order, and then concentrated under the conditions of 1 mmHg and 50° C., thereby obtaining a methyl isobutyl ketone (MIBK) solution with a concentration of solid contents of 59.8% by mass that contained a colorless and transparent liquid product (the compound (A) as polyorganosilsesquioxane having an alicyclic epoxy group (the compound represented by General Formula (2) in which Ra represents a 3-(acryloyloxy)propyl group, t=100, and u=0)} at a concentration of solid contents of 62.0% by mass.

The obtained compound (A) had a number-average molecular weight (Mn) of 2,130 and a dispersity (Mw/Mn) of 1.2.

(Preparation of Compound (B))

A methyl isobutyl ketone (MIBK) solution containing a compound B (a compound represented by General Formula (2) in which Ra represents a 3-(methacryloyloxy)propyl group, t=100, and u=0) at a concentration of solid contents of 60.5% by mass was obtained by the same method as that used for preparing the compound A, except that 300 mmol (70.3 g) of 3-(acryloyloxy)propyltrimethoxysilane used for preparing the compound (A) was changed to 300 mmol (74.5 g) of 3-(methacyloyloxy)propyltrimethoxysilane.

The obtained compound B had a number-average molecular weight (Mn) of 2,050 and a dispersity (Mw/Mn) of 1.1.

(Preparation of Compositions B and C for Forming Anti-Scratch Layer)

Compositions B and C for forming an anti-scratch layer were prepared by the same method as that used for preparing the composition A for forming an anti-scratch layer, except that the compound (A) or (B) was used instead of DPHA. In the following Table 3, the content of each of DPHA, the compound (A), the compound (B), IRGACURE 127, and RS-90 is an amount with respect to the total solid content (all components other than the solvents) in the composition for forming an anti-scratch layer. The content of each of MIBK and MEK is an amount with respect to the total amount of solvents in the composition for forming an anti-scratch layer. The solid content means the total content (concentration of solid contents) of solids with respect to the total mass of the composition for forming an anti-scratch layer.

TABLE 3

| Composition for forming anti-scratch layer Components | A Content (% by mass) | B Content (% by mass) | C Content (% by mass) |
|---|---|---|---|
| DPHA | 89 | | |
| Compound (A) | | 89 | |
| Compound (B) | | | 89 |
| IRGACURE 127 | 3 | 3 | 3 |
| RS-90 | 8 | 8 | 8 |
| MIBK | | 54.5 | 58.1 |
| MEK | 100 | 45.5 | 41.9 |
| Solid contents | 50 | 50 | 50 |

[Preparation of Substrate]

(Manufacturing of Polyimide Powder)

Under a nitrogen stream, 832 g of N,N-dimethylacetamide (DMAc) was added to a 1 L reactor equipped with a stirrer, a nitrogen injection device, a dropping funnel, a temperature controller, and a cooler, and then the temperature of the reactor was set to 25° C. Bistrifluoromethylbenzidine (TFDB) (64.046 g (0.2 mol)) was added thereto and dissolved. The obtained solution was kept at 25° C., and in this state, 31.09 g (0.07 mol) of 2,2-bis(3,4-dicarboxphenyl) hexafluorropane dianhydride (6FDA) and 8.83 g (0.03 mol) of biphenyltetracarboxylic dianhydride (BPDA) were added thereto, and the mixture was allowed to react by being stirred for a certain period of time. Then, 20.302 g(0.1 mol) of terephthaloyl chloride (TPC) was added thereto, thereby obtaining a polyamic acid solution with a concentration of solid contents of 13% by mass. Thereafter, 25.6 g of pyridine and 33.1 g of acetic anhydride were added to the polyamic acid solution, and the mixture was stirred for 30 minutes, further stirred at 70° C. for 1 hour, and then cooled to room temperature. Methanol (20 L) was added thereto, and the precipitated solid contents were filtered and ground. Subsequently, the ground resultant was dried in a vacuum at 100° C. for 6 hours, thereby obtaining 111 g of polyimide powder.

Preparation of Substrate S-1

The polyimide powder (100 g) was dissolved in 670 g of N,N-dimethylacetamide (DMAc), thereby obtaining a 13% by mass solution. The obtained solution was cast on a stainless steel plate and dried with hot air at 130° C. for 30 minutes. Then, the film was peeled from the stainless steel plate and fixed to a frame by using pins, and the frame to which the film was fixed was put in a vacuum oven, heated for 2 hours by slowly increasing the heating temperature up to 300° C. from 100° C., and then slowly cooled. The cooled film was separated from the frame. Then, as a final heat treatment step, the film was further treated with heat for 30 minutes at 300° C., thereby obtaining a substrate S-1 having a film thickness of 30 µm consisting of a polyimide film.

(Manufacturing of Hardcoat Film)

The polyimide substrate S-1 having a thickness of 30 µm was coated with the composition 1 for forming a hardcoat layer by using a #24 wire bar such that the film thickness became 15 µm after curing. After coating, the coating film was heated at 120° C. for 5 minutes. Then, under a condition of oxygen concentration of 1.0%, the coating film was irradiated with ultraviolet by using a high-pressure mercury lamp at a cumulative irradiation dose of 10 m/cm$^2$ and an illuminance of 18 mW/cm$^2$, thereby curing the coating film (partial curing).

Thereafter, the hardcoat layer was coated with the composition A for forming an anti-scratch layer by using a #2 wire bar such that the film thickness became 1 µm after curing. After coating, the coating film was heated at 120° C. for 5 minutes. Then, in an environment at 80° C., the coating film was irradiated with ultraviolet by using a high-pressure mercury lamp at a cumulative irradiation dose of 600 mJ/cm$^2$ and an illuminance of 160 mW/cm$^2$. Furthermore, the coating film was heated at 120° C. for 1 hour, thereby curing the coating film.

In this way, a hardcoat film was prepared which had a hardcoat layer and an anti-scratch layer on a substrate film.

Examples 2 to 4 and Comparative Examples 1 and 2

Compositions for forming a hardcoat layer and hardcoat films of Examples 2 to 4 and Comparative Examples 1 and 2 were obtained in the same manner as in Example 1, except that the MIBK solution including the polyorganosilsesquioxane (PSQ-1) was changed to MIBK solutions including (PSQ-2) to (PSQ-4), (PSQ-1x), and (PSQ-2x).

Comparative Example 3

A hardcoat film was obtained in the same manner as in Example 1, except that the bar coating using the composition for forming an anti-scratch layer in Example 1 was not performed.

Example 5

A hardcoat film of Example 5 was obtained in the same manner as in Example 1, except that the composition B for forming an anti-scratch layer was used instead of the composition A for forming an anti-scratch layer.

Example 6

A hardcoat film of Example 6 was obtained in the same manner as in Example 2, except that the composition C for forming an anti-scratch layer was used instead of the composition A for forming an anti-scratch layer.

[Evaluation]

The obtained hardcoat films were evaluated for the following items.

(Pencil Hardness)

Pencil hardness was evaluated according to JIS (JIS stands for Japanese Industrial Standards) K5400. The hardcoat films of examples and comparative examples were humidified for 2 hours at a temperature of 25° C. and a relative humidity of 60%. Then, 5 different sites within the surface of the anti-scratch layer were scratched using H to 9H testing pencils specified in JIS S 6006 under a load of 4.9 N. Thereafter, among the hardnesses of pencils found to leave visually recognized scratches at 0 to 2 sites, the highest pencil hardness was adopted as an evaluation result and described by being evaluated according to the following three standards A to C. For the pencil hardness, the higher the numerical value described before "H", the higher the hardness, which is preferable.

A: equal to or higher than 6H.
B: equal to or higher than 5H and less than 6H
C: equal to or lower than 4H (Resistance to Repeated Folding)

In order to evaluate the flexibility of the hardcoat films manufactured in examples and comparative examples, a bending test at a bend radius of 1.5 mm was repeated on the hardcoat films with the anti-scratch layer facing inwards, and whether or not cracks occurred by the test was checked. The results were evaluated based on the following three standards A to C.

S: No cracks occurred even after the hardcoat film was bent 800,000 times or more.
A: Cracks occurred at a point in time when the number of times of bending was equal to or greater than 500,000 and less than 800,000.
B: Cracks occurred at a point in time when the number of times of bending was equal to or greater than 100,000 and less than 500,000.
C: Cracks occurred before the hardcoat film was bent 100,000 times.

(Rub Resistance)

In an environment at a temperature of 25° C. and a relative humidity of 60%, steel wool (manufactured by NIHON STEEL WOOL Co., Ltd., No. 0) was wound around the tip rubbing portion (1 cm×1 cm), which will contact an evaluation target (hardcoat film), of a rubbing tester and fixed using a band so as to prevent the steel wool from moving. Then, the surface of the anti-scratch layer of the hardcoat film of each of the examples and comparative examples was rubbed under the following conditions.

Moving distance (one way): 13 cm,
Rubbing speed: 13 cm/sec,
Load: 1,000 g,
Contact area of tip portion: 1 cm×1 cm.

After the test, an oil-based black ink was applied to the surface, which was opposite to the anti-scratch layer, of the hardcoat film of each of the examples and the comparative examples. The reflected light was visually observed, the number of times of rubbing that caused scratches in the portion contacting the steel wool was counted, and the rub resistance was evaluated based on the following three standards.

A: No scratch was made even after the hardcoat film was rubbed 10,000 times.
B: No scratch was made even after the hardcoat film was rubbed 1,000 times, but while the hardcoat film was being rubbed 10,000 times, scratches were made.
C: While the hardcoat film was being rubbed 1,000 times, scratches were made.

TABLE 4

|  | Pencil hardness | Resistance to repeated folding | Rub resistance |
| --- | --- | --- | --- |
| Example 1 | A | A | A |
| Example 2 | A | B | B |
| Example 3 | A | B | A |
| Example 4 | B | A | A |
| Example 5 | A | S | A |
| Example 6 | A | S | B |
| Comparative Example 1 | B | C | B |
| Comparative Example 2 | C | A | C |
| Comparative Example 3 | A | A | C |

From the results shown in Table 4, it has been found that the hardcoat films of the examples of the present invention have extremely excellent rub resistance, high hardness, and excellent resistance to repeated folding.

According to the present invention, it is possible to provide a hardcoat film having excellent rub resistance, high hardness, and excellent resistance to repeated folding, an article and an image display device that have the hardcoat film, and a method for manufacturing the hardcoat film.

The present invention has been described in detail with reference to specific embodiments. To those skilled in the art, it is obvious that various changes or modifications can be added without departing from the gist and scope of the present invention.

What is claimed is:

1. A hardcoat film comprising:
a substrate;
a hardcoat layer; and
an anti-scratch layer,
wherein the hardcoat layer includes a cured product of polyorganosilsesquioxane, the polyorganosilsesquioxane is represented by the following General Formula (1), a film thickness of the anti-scratch layer is 1 μm to 5 μm, and the anti-scratch layer includes a cured product of a compound having two or more (meth) acryloyl groups in one molecule, $$\left[ (Ra)_p (Rb)_q (Rc)_r SiO_{1.5} \right] \quad (1)$$

wherein, in the General Formula (1), [SiO$_{1.5}$] represents a silsesquioxane portion in the polyorganosilsesquioxane; Ra represents a group containing a (meth) acryloyl group; Rb represents a group containing an epoxy group; Rc represents a monovalent substituent or a plurality of Rc's may form a bond with each other; p, q, and r represent a proportion of Ra, Rb, and Rc in the General Formula (1) respectively; p+q+r is 100; p and q are greater than 0; r is equal to or greater than 0; p/q is 0.01 to 99; in a case where there are a plurality of Ra's, a plurality of Rb's, and a plurality of Rc's in the General Formula (1), the plurality of Ra's may be the same as or different from each other, the plurality of Rb's may be the same as or different from each other, and the plurality of Rc's may be the same as or different from each other; and in a case where there is a plurality of Rc's in the General Formula (1), the plurality of Rc's may form a bond with each other, wherein a content rate of the cured product of the compound having two or more (meth)acryloyl groups in one molecule with respect to the total mass of the antiscratch layer is equal to or higher than 80% by mass, and wherein the compound having two or more (meth)acryloyl groups in one molecule is polyorganosilsesquioxane having (meth)acryloyl groups and is represented by the following General Formula (2),

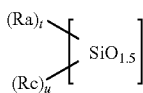

(2)

wherein, in the General Formula (2), Ra represents a group containing a (meth)acryloyl group; Rc represents a monovalent substituent; Ra, Rc, and [SiO$_{1.5}$] are defined as in Formula (1); t and u represent a proportion of each of Ra and Rc in the General Formula (2); t+u=100; t is greater than 0; u is equal to or greater than 0; in a case where there are a plurality of Ra's and a plurality of Rc's in the General Formula (2), the plurality of Ra's may be the same as or different from each other and the plurality of Rc's may be the same as or different from each other; and in a case where there is a plurality of Rc's in the General Formula (2), the plurality of Rc's may form a bond with each other.

2. The hardcoat film according to claim 1,
wherein Rb in the General Formula (1) is a group having a condensed ring structure of an epoxy group and an alicyclic group.

3. The hardcoat film according to claim 2,
wherein the group having a condensed ring structure of an epoxy group and an alicyclic group is a group having an epoxycyclohexyl group.

4. The hardcoat film according to claim 1,
wherein in the General Formula (1), (p+q)/(p+q+r) is 0.5 to 1.0.

5. The hardcoat film according to claim 2,
wherein in the General Formula (1), (p+q)/(p+q+r) is 0.5 to 1.0.

6. The hardcoat film according to claim 3,
wherein in the General Formula (1), (p+q)/(p+q+r) is 0.5 to 1.0.

7. The hardcoat film according to claim 1,
wherein in the General Formula (1), p/q is 0.5 to 2.0.

8. The hardcoat film according to claim 2,
wherein in the General Formula (1), p/q is 0.5 to 2.0.

9. The hardcoat film according to claim 1,
wherein in the General Formula (1), there is a plurality of Rc's, the plurality of Rc's form a bond with each other, and r/(p+q+r) is 0.005 to 0.20.

10. The hardcoat film according to claim 2,
wherein in the General Formula (1), there is a plurality of Rc's, the plurality of Rc's form a bond with each other, and r/(p+q+r) is 0.005 to 0.20.

11. The hardcoat film according to claim 1,
wherein a weight-average molecular weight of the polyorganosilsesquioxane represented by General Formula (1) is 2,000 to 20,000.

12. The hardcoat film according to claim 2,
wherein a weight-average molecular weight of the polyorganosilsesquioxane represented by General Formula (1) is 2,000 to 20,000.

13. The hardcoat film according to claim 1,
wherein a film thickness of the hardcoat layer is 1 to 50 μm.

14. The hardcoat film according to claim 2,
wherein a film thickness of the hardcoat layer is 1 to 50 μm.

15. The hardcoat film according to claim 1,
wherein the substrate is a plastic substrate.

16. An article comprising: the hardcoat film according to claim 1.

17. An image display device comprising: the hardcoat film according to claim 1 as a surface protection film.

18. A method for manufacturing a hardcoat film, comprising:
(I) coating a substrate with a composition for forming a hardcoat layer including polyorganosilsesquioxane so as to form a coating film (i) on the substrate;
(II) performing a curing treatment on the coating film so as to form a hardcoat layer;
(III) coating the hardcoat layer with a composition for forming an anti-scratch layer including a compound having two or more (meth)acryloyl groups in one molecule so as to form a coating film (ii) on the hardcoat layer, said anti-scratch layer having a film thickness of 1 μm to 5 μm; and
(IV) performing a curing treatment on the coating film (ii) so as to form an anti-scratch layer,
wherein the polyorganosilsesquioxane is represented by the following General Formula (1),

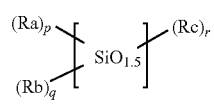

(1)

wherein, in the General Formula (1), [SiO$_{1.5}$] represents a silsesquioxane portion in the polyorganosilsesquioxane; Ra represents a group containing a (meth)acryloyl group; Rb represents a group containing an epoxy group; Rc represents a monovalent substituent or a plurality of Rc's may form a bond with each other; p, q, and r represent a proportion of Ra, Rb, and Rc in the General Formula (1) respectively; p+q+r is 100; p and q are greater than 0; r is equal to or greater than 0; p/q is 0.01 to 99; in a case where there are a plurality of Ra's, a plurality of Rb's, and a plurality of Rc's in the General Formula (1), the plurality of Ra's may be the same as or different from each other, the plurality of Rb's may be the same as or different from each other, and the plurality of Rc's may be the same as or different from each other; and in a case where there is a plurality of Rc's in the General Formula (1), the plurality of Rc's may form a bond with each other, wherein a content rate of the cured product of the compound having two or more (meth)acryloyl groups in one molecule with respect to the total mass of the antiscratch layer is equal to or higher than 80% by mass, and wherein the compound having two or more (meth)acryloyl groups in one molecule is polyorganosilsesquioxane having (meth)acryloyl groups and is represented by the following General Formula (2),

(2)

wherein, in the General Formula (2), Ra represents a group containing a (meth)acryloyl group; Rc represents a monovalent substituent; Ra, Rc, and [SiO$_{1.5}$] are defined as in Formula (1); t and u represent a proportion of each of Ra and Rc in the General Formula (2); t+u=100; t is greater than 0; u is equal to or greater than 0; in a case where there are a plurality of Ra's and a plurality of Rc's in the General Formula (2), the plurality of Ra's may be the same as or different from each other and the plurality of Rc's may be the same as or different from each other; and in a case where there is a plurality of Rc's in the General Formula (2), the plurality of Rc's may form a bond with each other.

* * * * *